United States Patent
Bersin et al.

(10) Patent No.: US 9,826,051 B2
(45) Date of Patent: Nov. 21, 2017

(54) CONTENT INTEGRATION FRAMEWORK

(71) Applicant: Amadeus S.A.S., Sophia Antipolis (FR)

(72) Inventors: Vincent Bersin, Le Rouret (FR);
Laurent Joffart, Roquefort les Pins (FR); Matthieu Recouly, Saint Laurent du Var (FR)

(73) Assignee: Amadeus S.A.S., Biot (FR)

( * ) Notice: Subject to any disclaimer, the term of this patent is extended or adjusted under 35 U.S.C. 154(b) by 274 days.

(21) Appl. No.: 14/159,519

(22) Filed: Jan. 21, 2014

(65) Prior Publication Data

US 2015/0207856 A1 Jul. 23, 2015

(51) Int. Cl.
*G06F 15/16* (2006.01)
*H04L 29/08* (2006.01)
*H04L 29/06* (2006.01)

(52) U.S. Cl.
CPC .......... *H04L 67/2823* (2013.01); *H04L 67/02* (2013.01); *H04L 67/22* (2013.01); *H04L 63/10* (2013.01); *H04L 63/20* (2013.01)

(58) Field of Classification Search
CPC ..... H04L 67/22; H04L 67/02; H04L 67/2823; H04L 63/20; H04L 63/10
See application file for complete search history.

(56) References Cited

U.S. PATENT DOCUMENTS

| 7,222,302 | B2 | 5/2007 | Hauser et al. |
| 8,599,851 | B2 * | 12/2013 | Amir ...................... H04L 45/16 370/390 |
| 9,235,834 | B2 * | 1/2016 | Bradley .................. G06F 21/10 |
| 2002/0046301 | A1 | 4/2002 | Shannon et al. |
| 2003/0028447 | A1 | 2/2003 | O'Brien et al. |
| 2003/0069975 | A1 | 4/2003 | Abjanic et al. |
| 2004/0088425 | A1 | 5/2004 | Rubinstein et al. |
| 2007/0209080 | A1 * | 9/2007 | Ture .................. G06F 17/30864 726/28 |

(Continued)

OTHER PUBLICATIONS

Florian Rosenberg et al., "Integrating Quality of Service Aspects in Top-Down Business Process Development Using WS-CDL and WS-BPEL" 11th IEEE International Enterprise Distributed Object Computing Conference, Oct. 1, 2007, Piscataway, NJ, p. 15.

(Continued)

*Primary Examiner* — Chirag R Patel
*Assistant Examiner* — Rachel J Hackenberg
(74) *Attorney, Agent, or Firm* — Thompson Hine LLP

(57) ABSTRACT

Systems, methods, and computer program products for interconnecting content requesting clients with a content provider platforms offering content. A client interface may be configured for transaction-oriented message exchange with the content requesting clients. A runtime module may be configured to map content-provider-specific data formats and content-provider-specific message flows to data formats and message flows utilized by the client interface. Content-provider-protocol-specific plug-ins may be provided. Each content-provider-protocol-specific plug-in defines rules for a mapping between the content-provider-specific data formats and the content-provider-specific message flows of at least one of the content provider platforms and the data formats and the message flows utilized by the client interface.

19 Claims, 17 Drawing Sheets

(56) References Cited

U.S. PATENT DOCUMENTS

| | | | | |
|---|---|---|---|---|
| 2007/0300212 | A1* | 12/2007 | Kersters | G06F 8/36 717/150 |
| 2012/0233235 | A1* | 9/2012 | Allaire | G06F 8/36 709/201 |
| 2014/0310386 | A1* | 10/2014 | Srinivasan | H04L 65/605 709/219 |

OTHER PUBLICATIONS

European Patent Office, International Search Report and Written Opinion issued in International Application No. PCT/EP2014/003359 dated Feb. 12, 2015.

* cited by examiner

- Source:

```
<books name="My books">
- <book bookid="1" pubdate="03/01/2002">
    <title>Java Web Services</title>
  - <authors>
      <author>David A. Chappel</author>
      <author>Tyler Jewell</author>
    </authors>
    <subject>Web Services</subject>
  </book>
- <book bookid="2" pubdate="01/01/2000">
    <title>Java Message Service</title>
  - <authors>
      <author>David A. Chappel</author>
    </authors>
    <subject>Java Message Service (JMS)</subject>
  </book>
- <book bookid="3" pubdate="03/01/2002">
    <title>Professional ebXML Foundations</title>
  - <authors>
      <author>Collin Evans</author>
      <author>David A. Chappel</author>
```

▶ Target:

```
<root>
  <book id="5" title"Beginner's Guide to Access 2.0" subject="Access" />
  <book id="7" title="Beginning ATL COM Programming" subject="C++" />
  <book id="6" title="Beginning Java 2" subject="Java" />
  <book id="4" title="Beginning Visual C++ 6 Database Programming" subject="Database" />
  <book id="9" title="Instant UNIX" subject="GNU/Linux" />
  <book id="2" title="Java Message Service Programming" subject="Database" />
  <book id="2" title="Java Message Service (JMS)" />
  <book id="1" title="Java Web Services" subject="Web Services" />
  <book id="3" title="Professional ebXML Foundations" subject="ebXML" />
  <book id="8" title="XML Applications" subject="XML" />
</root>
```

Fig. 8

- XSLT:

```
<xsl:stylesheet version="1.0" xmlns:xsl="http://www.w3.org/1999/XSL/Transform">
    <xsl:template match="/">
        <root>
            <xsl:for-each select="books/book">
                <xsl:sort select="title" order="ascending"/>
                <book>
                    <xsl:attribute name="id">
                        <xsl:value-of select="@bookid"/>
                    </xsl:attribute>
                    <xsl:attribute name="title">
                        <xsl:value-of select="title"/>
                    </xsl:attribute>
                    <xsl:attribute name="subject">
                        <xsl:value-of select="subject"/>
                    </xsl:attribute>
                </book>
            </xsl:for-each>
        </root>
    </xsl:template>
</xsl:stylesheet>
```

- XQuery:

```
<root>
{
    for $book in doc("file:///c:/tempXml/books.xml")/books/book
    order by $book/title
    return <book     id="{ $book/@bookid }" title="{ $book/title }"
                    subject="{ $book/subject }"/>
}
</root>
```

Fig. 9

CONTENT INTEGRATION FRAMEWORK

BACKGROUND

The present invention generally relates to computers and computer software. More specifically, it is directed to systems, methods, and computer program products for interconnecting content provider platforms using, for example, proprietary data exchange standards with information requesting clients.

An API server may be arranged to provide external access to application data and processes for B2B communication. The API server operates as a gateway between disparate business applications and allows data exchange between them by adapting the data from one application into another application.

SUMMARY

According to one embodiment, computer system is provided for interconnecting content requesting clients with a plurality of content provider platforms offering content by using content-provider-specific communication protocols. The computer system includes a client interface which is configured for transaction-oriented message exchange with the content requesting clients. The computer system also has a runtime module configured to map content-provider-specific data formats and content-provider-specific message flows to data formats and message flows utilized by the client interface. Furthermore, the computer system includes a plurality of content-provider-related plug-ins. Each content-provider-related plug-in defines rules for a mapping between the content-provider-specific data formats and content-provider-specific message flows of at least one of the plurality of content provider platforms and the data formats and message flows utilized by the client interface.

According to another embodiment, a method is provided for message exchange between content requesting clients and content provider platforms offering content by using content-provider-specific communication protocols. The method includes receiving a content request from a requesting client at an interconnecting computer via a client interface. The content request is mapped by the interconnecting computer to at least one content-provider-specific message flow comprising at least one provider message formatted in accordance with content-provider-specific data formats. The mapping utilizes at least one of a plurality of content-provider-related plug-ins. Each content-provider-related plug-in defines rules for a mapping between the content-provider-specific data formats and content-provider-specific message flows of at least one of the plurality of content provider platforms and the data formats and message flows utilized by the client interface. The interconnecting computer processes the content-provider specific message flow with at least one of the content provider platforms and responds to the content request via the client interface.

According to still another embodiment, a non-transitory computer readable storage medium with computer program instructions stored therein is provided configured to perform the activities of the method as described above when executed on an interconnecting computer.

BRIEF DESCRIPTION OF THE SEVERAL VIEWS OF THE DRAWINGS

The present invention will be described with reference to the accompanying figures. Similar reference numbers generally indicate identical or functionally similar elements.

FIGS. 8 and 9 show an exemplary implementation of a data format conversion.

DETAILED DESCRIPTION

Figure 1:
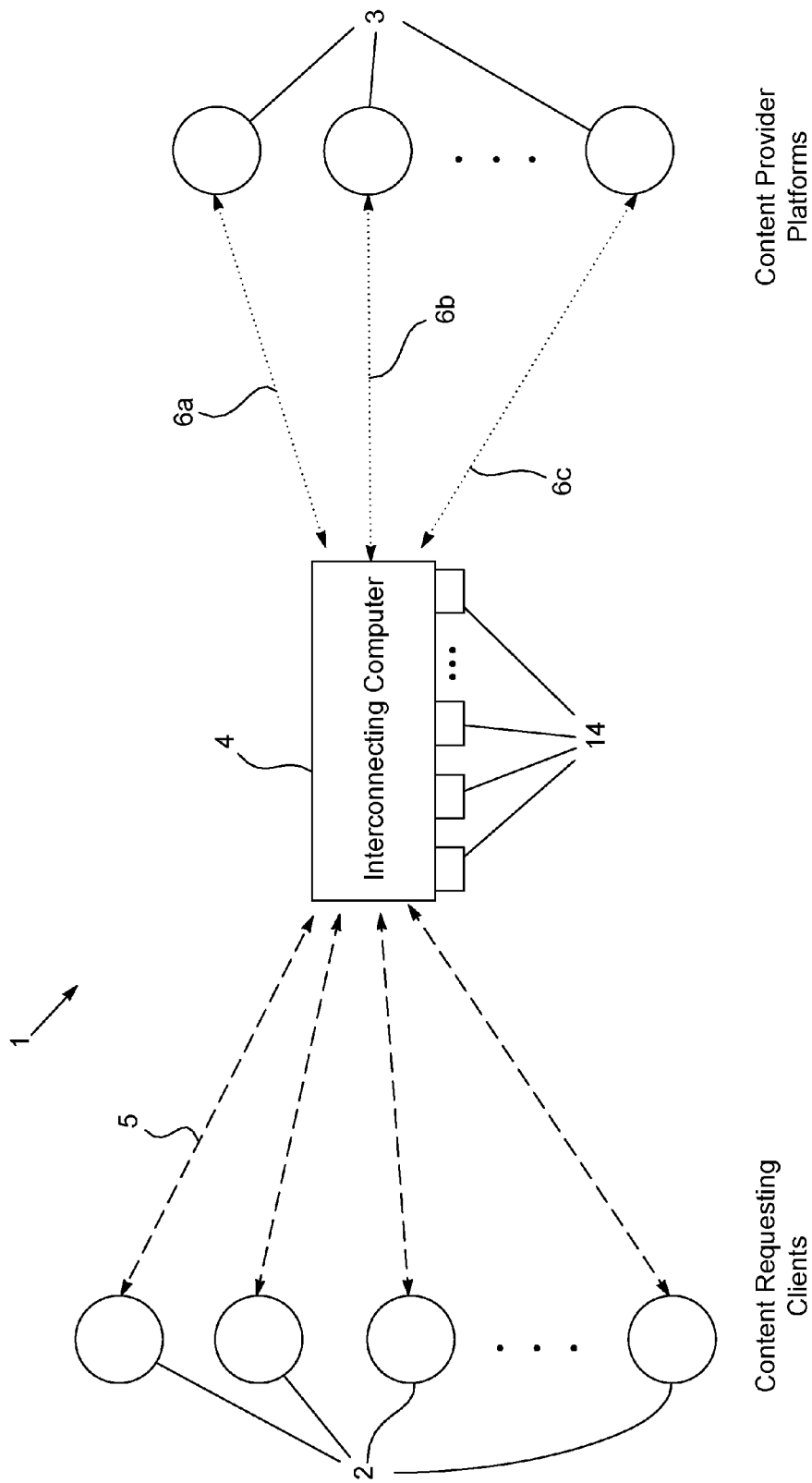
FIG. 1 schematically shows a system including an interconnecting computer, content requesting clients and content provider platforms.

Before turning to more detailed description with reference to FIGS. 2 to 13, some more general aspects will be set forth first, inter alia on the basis of FIG. 1.

Management and distribution of information is an important goal of nowadays information technology. A large variety of different standard and proprietary communication protocols, message exchange mechanisms, data types and formats as well as information exchanging applications leads to substantial heterogeneity which hampers information exchange between entities. Existing protocols, message exchange standards, data formats and applications are developed further in a rapid manner. Backward compatibility is not always ensured. Furthermore, more and more new protocols, message exchange standards, data formats and applications join the information technology landscape.

Thus, in view of such highly volatile information exchange environment, there is a need to interconnect dissimilar information exchange mechanisms in a highly adaptable, easily producible and maintainable, inexpensive and scalable manner.

The present invention provides a solution to allow an easy and cross-channel integration of any sort of information or content into an information provision system which is accessible as a uniform frontend to information requesting clients. The term "information provision system" refers to any sort of collective information source, such as search engines holding previously gathered content, dynamic inventory systems, Global Distribution Systems (GDS) as employed in the travel industry, online booking platforms, webshops, etc.

This integration is realized by a computer system, hereinafter referred to as "interconnecting computer", which is arranged to interconnect a plurality of content provider platforms with the information requesting clients. The content provider platforms offer content in which the clients are interested in. Generally, the clients submit requests for content to the interconnecting computer instead of directly communicating with the content provider platforms. The interconnecting computer provides a uniform and standardized communication interface vis-à-vis all potential clients, which is hereinafter briefly referred to as the interconnecting computer's "client interface".

A schematic representation of such an environment 1 is given by FIG. 1, depicting content requesting clients 2 communicating over client interface 5 with the interconnecting computer 4 which, in turn, communicates with content provider platforms 3 over the respective content-provider-specific interfaces 6a, 6b, 6c. The mapping functionality is provided by the plug-ins 14.

The term "clients" is used herein to denote a combination of hardware and software utilized by any kind of user. Hence, it is generally a terminal such as a personal computer, laptop, smartphone etc. with software arranged to generate the information requests and equipped with a network interface in order to transmit the requests to the interconnecting computer 4.

The information requests which the clients 2 direct to the interconnecting computer 4 via client interface 5 may be any sort of requests or queries, such as, application packets transmitted by using the TCP/IP Internet protocol suite including packets according to protocols like HTTP or HTTPS or webservice message e.g. on the basis of SOAP, REST and others like Email or SMS/MMS. Depending on the content sought, the request may be categorized as search request, reservation or booking requests, database requests and the like. At the lower layers, Client interface 5 may be realized by various communication standards, for example by wired technologies such as Ethernet or ATM or by wireless/mobile networks such as 2G/3G/4G or WiFi (IEEE 802.11).

By nature, the requests occur in a transaction-oriented message exchange environment (as opposed to a batch-oriented information processing) as the clients 2 generally await a timely response to their requests. Thus, the interconnecting computer 4 is generally arranged to ensure reasonable response times in processing the requests and providing the clients 2 with respective response messages. The response messages are the counterpart of the requests as they are also sent over the client interface, i.e. by using the same protocol(s) as the requests.

The interconnecting computer 4 acts on behalf of the clients in the sense that it executes any subsequent communication with the content provider platforms 3 in order to obtain responses to the client's request, generally the content or information sought by the requests. One of the main issues the interconnecting computer 4 deals with is the fact that the content provider platforms 3 are generally arranged to communicate by using any existing communication protocols, message flows and data/message structures. A particular content provider platform may offer its data via a HTTP-utilizing interface, while another particular provider platform communicates via Email (i.e. SMTP), while a third particular provider platform bases its information exchange on SQL messages. Other content provider platforms may utilize webservice protocols like SOAP. Generally, on the application layer, any content provider platform may use its own, possibly proprietary message flow and message and data structures. These possibly proprietary message flows and message and data structures are referred to as "content-provider-specific message flows" and "content-provider-specific data formats", respectively, although it should be noted that a plurality of content provider platforms 3 may utilize the same content-provider-specific message flow and data formats. As a super-ordinated term covering "content-provider-specific message flows" and "content-provider-specific data formats", the term "content-provider-specific protocol" is used. Thus, in order to perform communication on behalf of the clients, more specifically to further relay the requests to the appropriate content provider platform(s), the interconnecting computer 4 translates the requests into the aforementioned content-provider-specific protocols employed be this/these content provider platform(s).

At the lower layers, the content-provider-specific interfaces 6a, 6b, 6c may again be realized by various communication standards, for example by wired technologies such as Ethernet or ATM or by wireless/mobile networks such as 2G/3G/4G or WiFi (IEEE 802.11).

To this end, the interconnecting computer 4 includes a runtime module which is arranged to perform mapping in two respects. It maps the requests of the clients which are generated according to data formats and message flows in accordance with the definition of the client interface to content-provider-specific data formats and content-provider-specific message flows, and vice versa.

Thus, a particular client 2 issues one request which may be composed of one message or multiple messages relating to each other and sent according to a message flow in accordance with the specifications of the client interface 5. The one message or multiple messages and the data carried by them are formatted in accordance with the specifications of the client interface 5, too. The interconnecting computer 3 maps the client-interface-specific data formats and message flow of this one message or these multiple inter-related message forming the request to content-provider-specific data formats on the one hand and to content-provider-specific message flows on the other hand, in order to cope with the possibly proprietary communication interface offered by the content provider platform 3 for outside communications.

At least the second aspect, the translation between message flows differs from API servers that are only capable of mapping simple data formats.

Mapping of data formats and message flows by the interconnecting computer is achieved by plug-ins 14. Plug-ins 14 are mainly known as pluggable software extension modules in (parent) software programs such as the common application programs nowadays used on personal computers (such as Browsers, E-mail clients, Office software, etc.). They are usually employed to add further functionality to the parent software program such as an advertisement blocker or a PDF reader. The present invention re-uses the concept of plug-ins in a new fashion by providing the interconnecting computer with plug-ins 14 (cf. FIG. 1) for connecting to the content provider platforms. Each plug-in 14 contains rules for mapping between client-interface-specific data formats and message flows and content-provider-specific data formats and message flows. Thus, one plug-in realizes a connection of the interconnecting computer 4 with any content provider platform utilizing the respective content-provider-specific data formats and message flows (which may be a single content provider platform 3 or a plurality of content provider platforms 3 employing the same content-provider-specific data formats and message rules). Alternatively, one plug-in 14 may include the mapping rules for mapping the client-interface-specific data formats and message flows to one or a plurality of content provider platforms 3 which employ different content provider protocols, i.e. different content-provider-specific data formats and message flows, in an aggregated manner. Subsequently, both types of plug-ins are referred to as "content-provider-related plug-ins". Hence, a content-provider-related plug-in may either implement a mapping to a single content-provider-specific protocol (used by at least one content provider platform 3) or to a plurality of content-provider-specific protocols (used by at least one content provider platform 3).

Employing plug-ins 14 to implement the interconnecting computer's mapping functionalities conveys several advantages, such as: The mapping functionalities are easily and quickly extendible since the support of a new contentprovider-specific interface only requires addition of a further plug-in. Engineering of new plug-ins and further developments or maintenance of the interconnecting computer's core components may be conducted independently from each other, i.e. geographically distributed and/or by separate personnel. For example, the plug-in approach facilitates delegation of mapping functionalities creation by personnel of a content provider running a content provider platform 3, the personnel having the best knowledge of the content-provider-specific data formats and message flows. Adaption of mapping functions, e.g. in the case that the communication interface 6 of a content provider platform changes, is easy since only the respective plug-in needs to be adapted accordingly, while the remaining components of the interconnecting computer 4 remain unaffected. Generally, the modular approach results in good maintainability of the interconnecting computer since its basic framework with central components and the plurality of plug-ins are independent from each other and therefore can each be adapted and further developed without having to necessarily adapt other components.

The interconnecting computer 4 may be implemented as one machine or station such as a personal computer or a server along with the software providing the functions described herein. However, depending on its required computing resources, the interconnecting computer 4 may be implemented by a plurality of connected servers e.g. server farm co-located within a local area network or geographically distributed in a wide area network. An exemplary structure/architecture of a single-machine interconnecting computer 4 is given further below with reference to FIG. 13.

Optionally, the runtime module of the interconnecting computer 4 is further arranged to determine at least one content provider platform for answering a content request received via the client interface. To this end, the interconnecting computer 4 evaluates information included in the client's content request and makes a decision which of the content provider platforms 3 is to be queried for information in order to respond to the request. These information in the client request may be explicit, e.g. a destination identifier located in a message header explicitly indicating to which content provider platform(s) 3 the request is directed, or it may be implicit, meaning that the intended content provider platform(s) 3 is/are derived from the payload of the message(s) forming the content request.

Subsequent to selecting the content provider platform(s) 3, the interconnecting computer 4 communicates with the determined one or multiple content provider platform(s) in the way outlined before, i.e. by mapping the content request to the data formats and message flows according to the respective provider-specific interface(s). Thus, the function of selecting one or multiple content provider platform(s) 3 may be considered as a kind of routing or switching, although the interconnecting computer 4 does actually not forward the request (or the message(s) forming the request) to the selected content provider platform(s), but only the mapped messages being in line with the data format and message flow specifications on the content-provider-specific interface. Thus, the interconnecting computer 4 may be regarded as a router-gateway hybrid including both, routing and translating functionality.

Optionally, the rules specifying how to map between client-interface-specific and content-provider-specific data formats and message flows are defined by non-executable files included in the plug-ins, as opposed to executable program code. The files including the rules may be XML-based, the rules being defined by XML-conform notation. Alternatively, any other suitable notation may be employed for defining the rules, e.g. a Backus-Naur-Form-like notation utilized e.g. for mapping WAP headers to a binary encoding. In a simple example, such kind of rule definition may be included in simple text files (e.g. *.txt).

Optionally, the rules for mapping data format and for mapping message flows are kept in separate files. According to one option, the rules for mapping message flows are held in BPEL files (BPEL=Business Process Execution Language), while the rules for mapping data formats are included in Extensible Stylesheet Language Transformations (XSLT) and/or XQuery files. Thus, in this example, each plug-in defining the mapping for one particular content-provider-specific interface, respectively, includes at least one BPEL file defining the rules for the mapping between the content-provider-specific message flows of the at least one of the plurality of content provider platforms 3 and the message flows utilized by the client interface 5 and either at least one XSLT file or at least one XQuery file defining the rules for the mapping between the content-provider-specific data formats of the at least one of the plurality of content provider platforms 3 and the data formats utilized by the client interface 5.

Optionally, the interconnecting computer 4 is not only arranged for executing the communication functions by employing the mapping as described above, but furthermore offers tools for developing and adapting the rules. For example, the interconnecting computer 4 may be equipped with an integrated development environment including appropriate development tools. In order to ease rule definition, the development tools offer a graphical user interface and allow the developer to define rules in a visual manner, e.g. by using drag-and-drop mechanisms and/or other suitable graphical methods. Thus, software engineering or programming capabilities are not required for defining new or adapting existing rules.

Optionally, the interconnecting computer 4 is further arranged as a stateless communication platform, meaning that it handles messages received from clients independently from each other without taking into account any interrelations between the messages. In this case, the interconnecting computer 4 is generally not concerned with session management. In order to nevertheless being capable to communicate with stateful clients 2 and/or stateful content provider platforms 3, the interconnecting computer 4 may convey context and/or session data in the messages sent to the clients 2 and/or content provider platform(s) 3, by adding these state data e.g. aside the regular message payload. The clients 2 and/or the content provider platform(s) 3 then include these state data into subsequent request messages and response messages, respectively enabling the interconnecting computer 4 to relate the subsequent request and response messages to earlier messages. The content provider platform(s) 3 then process also these state data included in the messages received by them and include respective state data in the response messages returned to the interconnecting computer 4. The interconnecting computer 4, in turn, processes the respective state data included in the response messages received from the content provider platform(s) 3. In that way, the interconnecting computer 4 is enabled to recognize to which state the response messages received from the content provider platform(s) relate. The interconnecting computer 4 then responds to a stateful client 2 appropriately according to the recognized state of the client 2, without having to implement a state management itself.

In further options and examples, the interconnecting computer 4 is equipped with further functions such as caching content received from content provider platforms 3 and management of such cached content, security measures such as authentication and/or encryption versus the clients and/or the content provider platforms 3, monitoring response times in order to ensure timely response to content requests, logging of traffic e.g. for error recognition and analysis, compression techniques etc.

Figure 2:
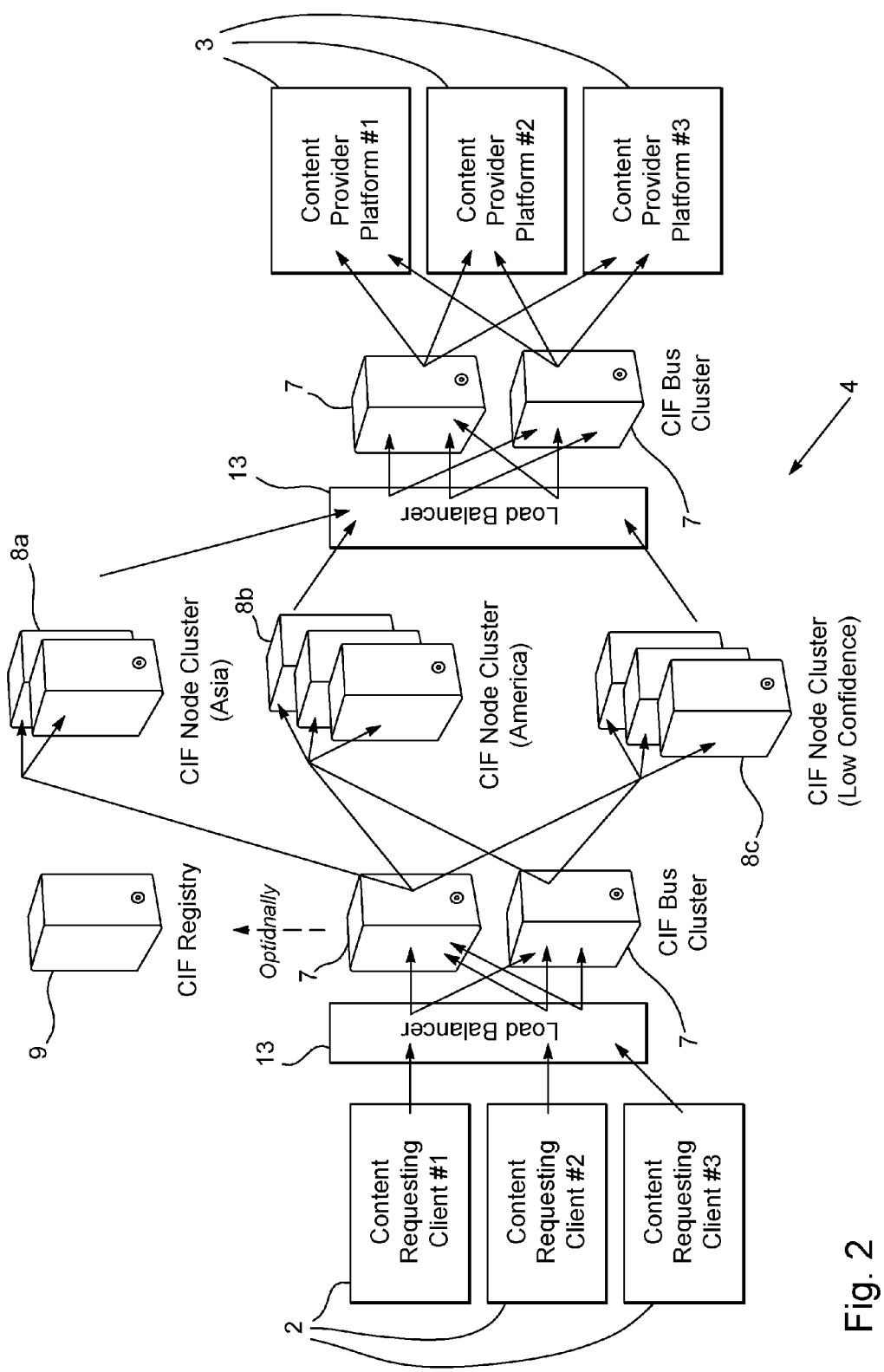
FIGS. 2, 3 and 4 schematically depict architecture details of the system of FIG. 1.
Figure 3:
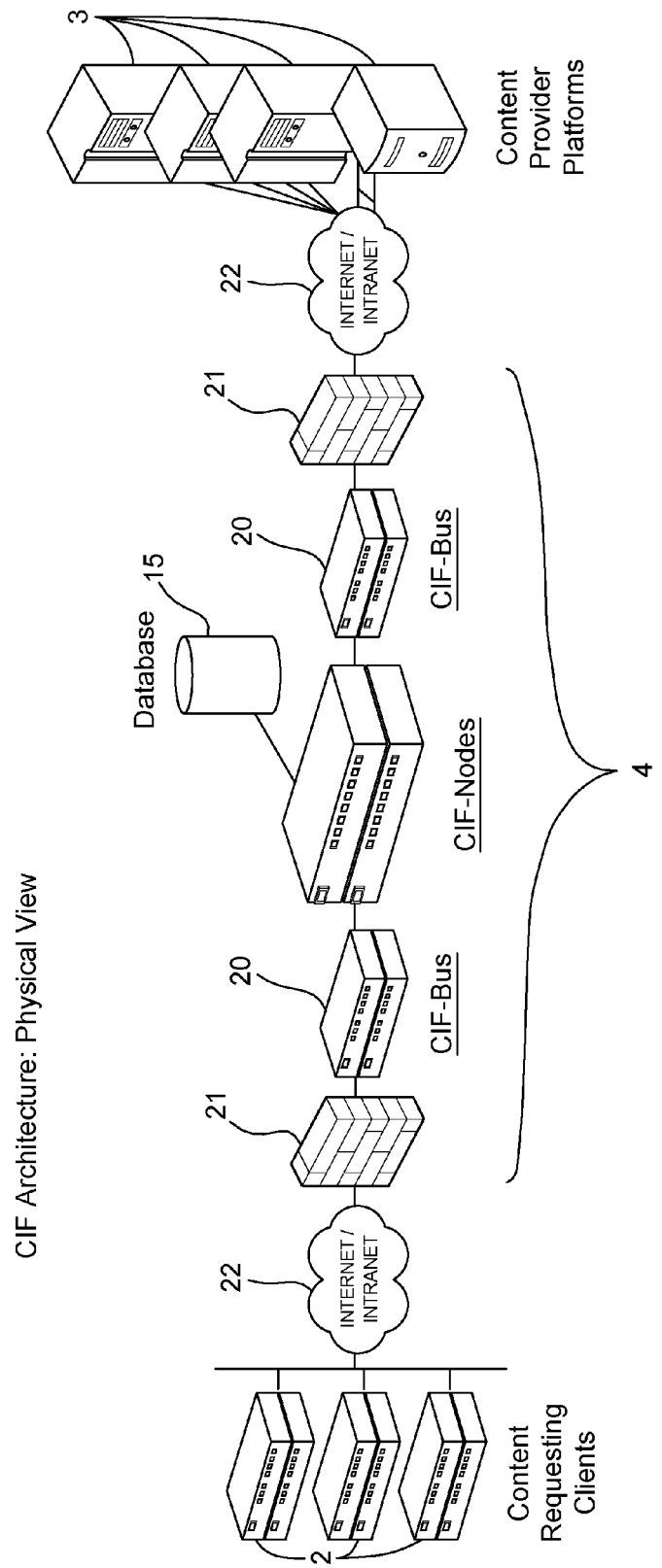
Figure 4:
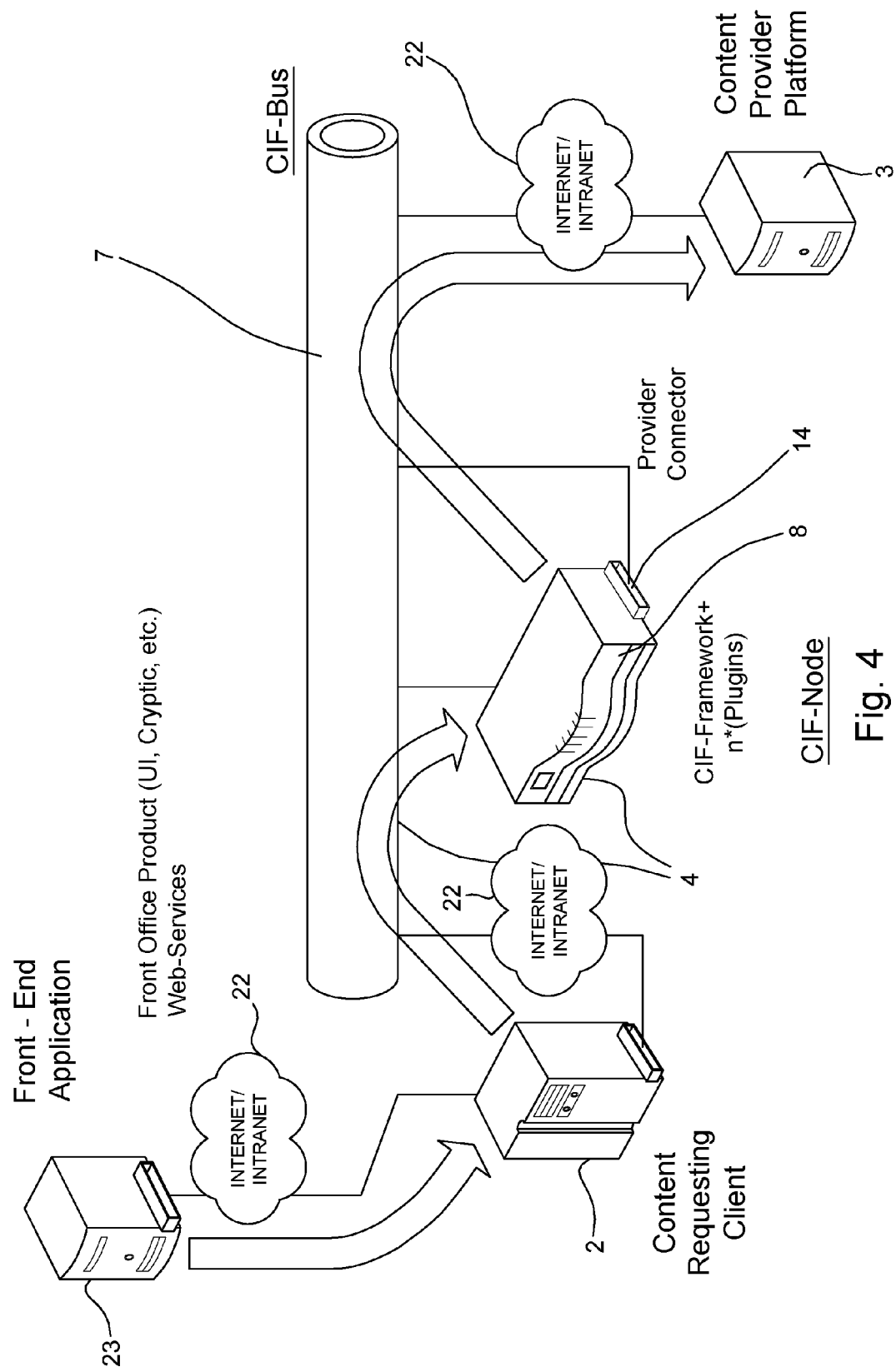

Now turning to the more detailed description, FIGS. 2 to 4 show architecture examples of the of the interconnecting computer 3 and its connection to the clients 2 and the content provider platforms 4.

FIG. 2 shows an architecture example of an embodiment the interconnecting computer being employed in a travel reservation system. In this exemplary system, the content provider platforms 3 are hosted by travel product providers such as TAM, Avis and Swedish Rail. They are connected to the interconnecting computer 4 by different content-provider-specific communication interfaces such as a WebService interface 6a using a proprietary WebService specification, a WebService interface 6b utilizing SOAP 1.1 and an XML-over-HTTP interface 6c not using SOAP, but relying on an arbitrary XML document object model.

In the example of FIG. 2, the interconnecting computer 4 is generally referred to as a "Content Information Framework", briefly: CIF. From an architecture point of view, the CIF is split into two major components, a system bus, also referred to as "CIF-Bus", implemented by CIF-Bus cluster 7 and a runtime module, also referred to as "CIF-Node", exemplarily implemented by two CIF-Node clusters 8a, 8b, 8c.

The CIF-Bus 7 is responsible for actually handling the communication on the two interfaces of the CIF, the content-provider-specific interfaces 6a, 6b, 6c vis-à-vis the content provider platforms 3. The CIF-Bus' functionality includes handling content requests arriving over the client interface 5, selecting appropriate content provider platforms 3 and respective message "routing" functions, processing the communication with the content provider platforms 3, additional functions, e.g. security-related processing such as encrypting communication and authorization/authentication. Authorization checks are performed vis-à-vis the clients 2 in order to ensure that a client has the right to perform a particular requested transaction. Authentication may also being performed vis-à-vis or by the content provider platforms 3 depending on the protocols employed on their respective content-provider-specific interfaces 6a, 6b, 6c, e.g. by using SSL over HTTP with SSL certificates. In some embodiments, further supported functions include band-width saving compression capabilities such as GZip or RFC2507 as well as other protocol conversion mechanisms such as data packet adaptation, packet splitting/segmentation, pipelining, multiplexing, etc. These exemplary functions of the CIF-Bus 7 are more generally referred to as the CIF-Bus 7 being arranged to adapt the communication protocols being employed between the CIF and the content provider platforms 3.

Figure 5:
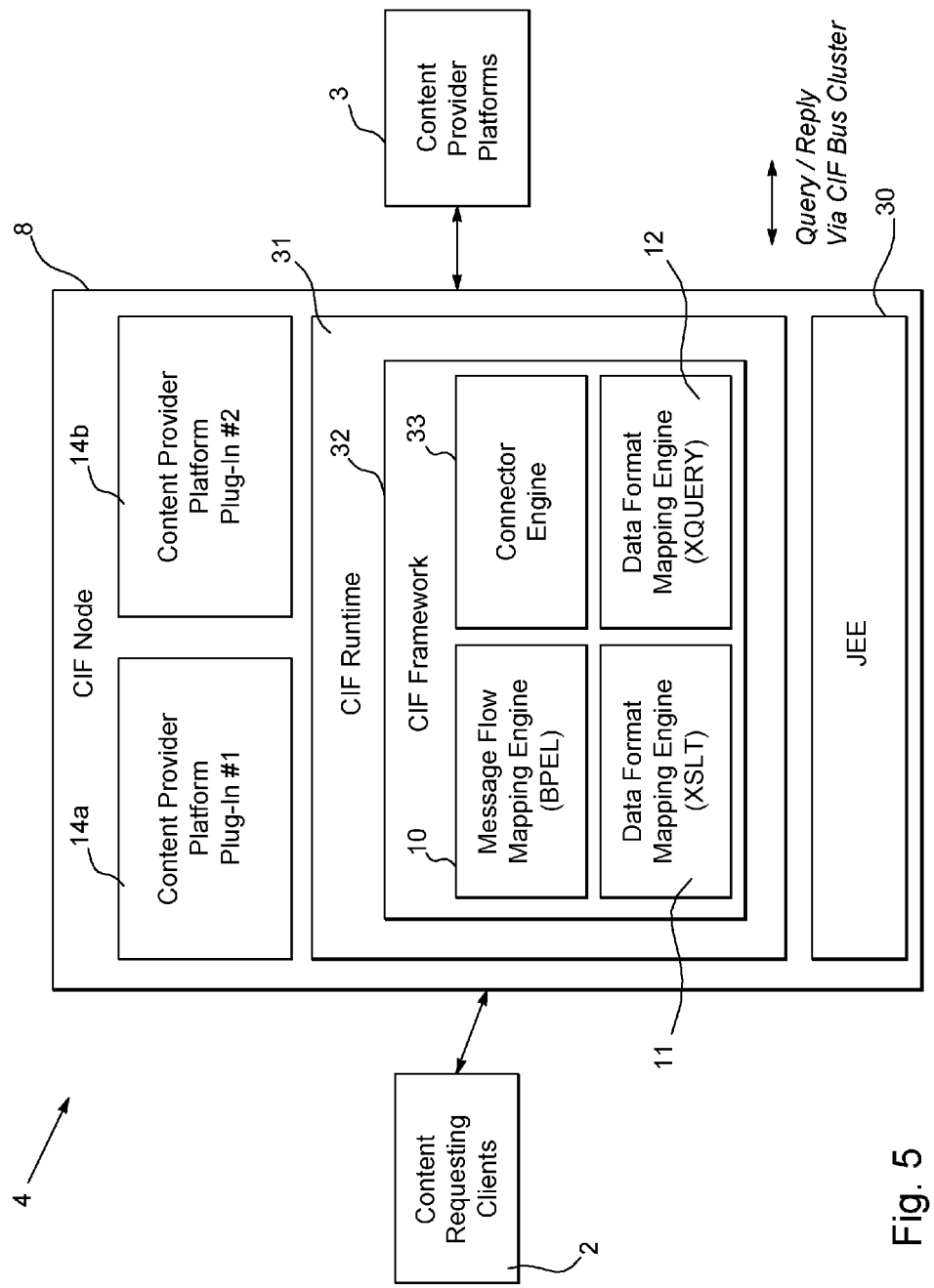
FIGS. 5 and 6 illustrate an exemplary software architecture of the interconnecting computer.

The CIF-Node clusters 8a, 8b, 8c implement the mapping functionality of the CIF, i.e. mapping content requested received over the client interface 5 to data formats and message flows expected by the respective content provider platform 3. They are responsible for hosting and running the plug-ins 14 containing the content-provider-specific mapping rules. To this end, the CIF-Nodes 8a, 8b, 8c include engines 10, 11 processing the plug-ins (FIG. 5). In the example of FIG. 5, the BPEL engine 10 is responsible for handling BPEL files containing message-flow-mapping rules, while the XSLT engine 11 processes XSLT files specifying data-format-translation rules. These engines are deployed on the CIF-Nodes 8a, 8b, 8c as Java artifacts, such as Enterprise Archive (EAR), Web Archive (WAR) or Java Archive (JAR). The plug-ins 14 include calls to those engines with the appropriate logic to adapt data and flows to the content provider specificities. Thus, from a software architecture standpoint, the CIF-Nodes 8a, 8b are JEE stacks which run on any JEE compatible application server.

Furthermore, CIF-Nodes 8a, 8b, 8c may include a database 15 for reading and/or persisting mapping information, provider configuration, reference data or client/provider context information.

In the example of FIG. 2, three CIF-Nodes 8a, 8b and 8c are provided for different groups of content provider. Different assignment schemes for balancing the CIF-Nodes 8a, 8b, 8c are possible, for example according to geographical criteria, such as one CIF-Node 8a for content provider platforms 3 located in Asia and one CIF-Node 8b for content provider platforms 3 located in America. In this example, the CIF itself with its components including the CIF-Nodes may be residing at a single location or, alternatively, it may be de-localized, e.g. the Asia-serving CIF-Node 8a being located in Asia and the America-serving CIF-Node 8b being located in the US (while the CIF-Bus may be co-located with one of the two CIF-Nodes 8a, 8b, being located at still another location or being distributed by itself over various locations). Another assignment scheme relates to a categorization of content provider platforms 3. For example, some content providers may be subscribed to the CIF as premium providers and the content provider platform(s) 3 of these content providers may therefore have assigned CIF hardware and software with higher performance than other content providers which are only subscribed as "low confidence providers". The latter ones might share a single CIF-Node 8c, as indicated by FIG. 2.

In other examples, another number of CIF-Nodes 8 may be present, e.g. only one CIF-Node in the case of a limited number of content provider platforms 3 connected to the CIF and the traffic caused by them, respectively, or more than two CIF-Nodes in the case of a higher number of content provider platforms 3 connected to the CIF and the traffic caused by them, respectively.

In the example of FIG. 2, the CIF-Nodes 8a, 8b, 8c are constructed in the same manner with respect to their software architecture and are therefore identical in that regard (they differ, however, in the plug-ins 14 hosted by the engines 10, 11).

Furthermore, the CIF shown by FIG. 2 is optionally equipped with a registry 9 which maintains e.g. identification and authentication information as regards the content provider platforms, known client systems, implemented plug-ins and/or routing rules. The registry 9 might be implemented as an UDDI registry (UDDI="Universal Description, Discovery and Integration").

The architecture as depicted by FIG. 2 allows for separating message-handling functions from mapping functions. This supports scalability of the overall interconnecting computer 4 as a traffic increase, e.g. caused by a larger number of requests per time, does not necessarily require adding an additional CIF-Bus instance, as the CIF-Bus 7 is not loaded with the mapping functionalities and may therefore be sufficiently capable of handling an increased amount of message traffic. On the other hand, further CIF-Nodes 8a, 8b, 8c can be added and connected to the CIF-Bus 7 in the case if more demanding memory and CPU consumption requirements resulting from an increased amount of mapping activities. Also, this architecture brings flexibility regarding maintenance and update, as it is possible to only update one component without impacting the other ones. The two component types, CIF-Bus 7 and CIF-Nodes 8a, 8b, 8c are therefore loosely coupled, i.e. by a specific communication interface e.g. utilizing TCP/IP and hiding the internal functions of the CIF-Bus 7 and CIF-Nodes 8a, 8b, 8c from each other.

The CIF of FIG. 2 is connected to clients 2 via the client interface 5. A request is sent by a client application to the CIF. This request first hits a physical load-balancer 13 that dispatches it to the CIF-Bus cluster 7. An instance of the CIF-Bus 7 handles the request, determines which CIF-Node cluster 8a, 8b, 8c can handle it and routes it to the appropriate CIF-Node cluster 8a, 8b, 8c. The selected CIF-Node cluster 8a, 8b, 8c in turn determines one or several content provider platform(s) 3 which are supposed to respond to the request, maps the request to the data format(s) and message flow(s) of the determined content provider platform(s) 3 and issues the mapped message(s) to the CIF-Bus cluster 7. Subsequently, the CIF-Bus cluster 7 transmits the mapped messages to the respective content provider platform(s) 3, again via Load Balancer 13. Handling the response message from the content provider platforms by the CIF substantially works in the same, reversed way.

FIG. 3 conveys a different visualization of the overall environment. Again, the interconnecting computer 4 is referred to as Content Integration Framework and depicted as CIF farm 4 including CIF database 15. Compared with FIG. 2, FIG. 3 shows some further aspects of the CIF and environment.

The elements designated by 20 indicate that the CIF-Bus 7 is, in the example of FIG. 3, implemented as an Enterprise Service Bus (ESB). It has been recognized that an ESB 20 offers the basic functionality of the CIF-Bus 7 as it provides a unique point to manage connectivity and security as well as fast message routing.

Furthermore, FIG. 3 indicates another security aspect, namely that the CIF is protected vis-à-vis the content provider platforms 3 by a firewall 21, as generally a public, insecure network such as the Internet or Intranet 22 is used for this connection. In some embodiments, the CIF is also or instead protected vis-à-vis the content requesting clients 2 by another or additional firewall 21. Alternatively or additionally, the CIF may communicate with the clients 2 and/or the content provider platforms 3 by using Virtual Private Network (VPN) techniques.

FIG. 4 presents a logical overview of the system introduced by FIGS. 2 and 3. As shown by FIG. 4, content requests may be initiated by front-end applications 23 such as travel-information and travel-reservation software as employed by travel agencies. Front-end application 23 puts a content request to content requesting client 2. This communication between front-end application 23 and content requesting client 2 may occur over any network such as the Internet or an intranet 22. As described above, the content requesting client 2 transmits the respective content request via the CIF-Bus 7 (on top of Internet/intranet 22) to a CIF-Node 8. CIF-Node 8 includes the plug-ins 14. FIG. 4 exemplarily shows a single plug-in 14 referred to as "provider connector". As described in detail above, CIF-Node 8 is connected to the content provider platform 3 via CIF-Bus 7 and, usually, over a public WAN like the Internet or a private intranet 22. This provider-specific interface is realized by the mapping functionality implemented by the respective content-provider-related plug-in 14.

FIG. 5 gives an insight into an exemplary software architecture of the interconnecting computer 4, more specifically of the CIF node clusters 8a, 8b, 8c as described with reference to FIG. 2. As indicated by FIG. 5, the software environment is composed of several layers.

The bottom layer 30 is formed by Java Platform Enterprise Edition (JEE). As generally known, this platform includes several Application programming interfaces (APIs) as well as a runtime environment for developing and running enterprise software. Additionally, it provides including network and web services support and other large-scale, multi-tiered, scalable, reliable, and secure network applications. Other embodiments may be based on other technologies such as Microsoft's .NET platform or C++, etc.

On top of this underlying middleware platform 30, the interconnecting computer's runtime 31, in FIG. 5 denoted as CIF runtime. It mainly includes the CIF Framework 32. The CIF Framework 32, in turn, includes the engines for processing the plug-ins 14. In the example of FIG. 5, CIF Framework 32 includes three engines, BPEL engine 10, XSLT engine 11 and XQuery engine 12. As already outlined above, BPEL engine 10 processes BPEL files being part of the plug-ins 14, the BPEL files specifying the rules for message flow mapping. On the other hand, the XSLT engine 11 processes XSLT files and the XQuery engine 12 inputs XQuery files, both of which specifying rules for data format mapping. As a forth sub-sub-component, the CIF Framework 32 includes a database connection 15 (not shown by FIG. 5, cf. FIG. 3). Finally, a fifth component, Connector Engine 33, is responsible for determining the content provider platform(s) 3 to which the content requests is to be directed to and for issuing the mapped messages to the CIF-Bus 7.

On top of the CIF runtime 31, the content-provider-specific plug-ins 14 are located. FIG. 5 exemplarily shows two plugins 14, a plug-in 14a exemplarily associated with a travel portal and a plug-in 14b exemplarily related to a rail company. Both plug-ins 14a, 14b include BPEL files 36 defining message-flow-mapping rules. As regards mapping of data format, however, plug-in 14a includes XSLT files 37, while plug-in 14b includes XQuery files 38 (cf. FIG. 6).

Figure 6:
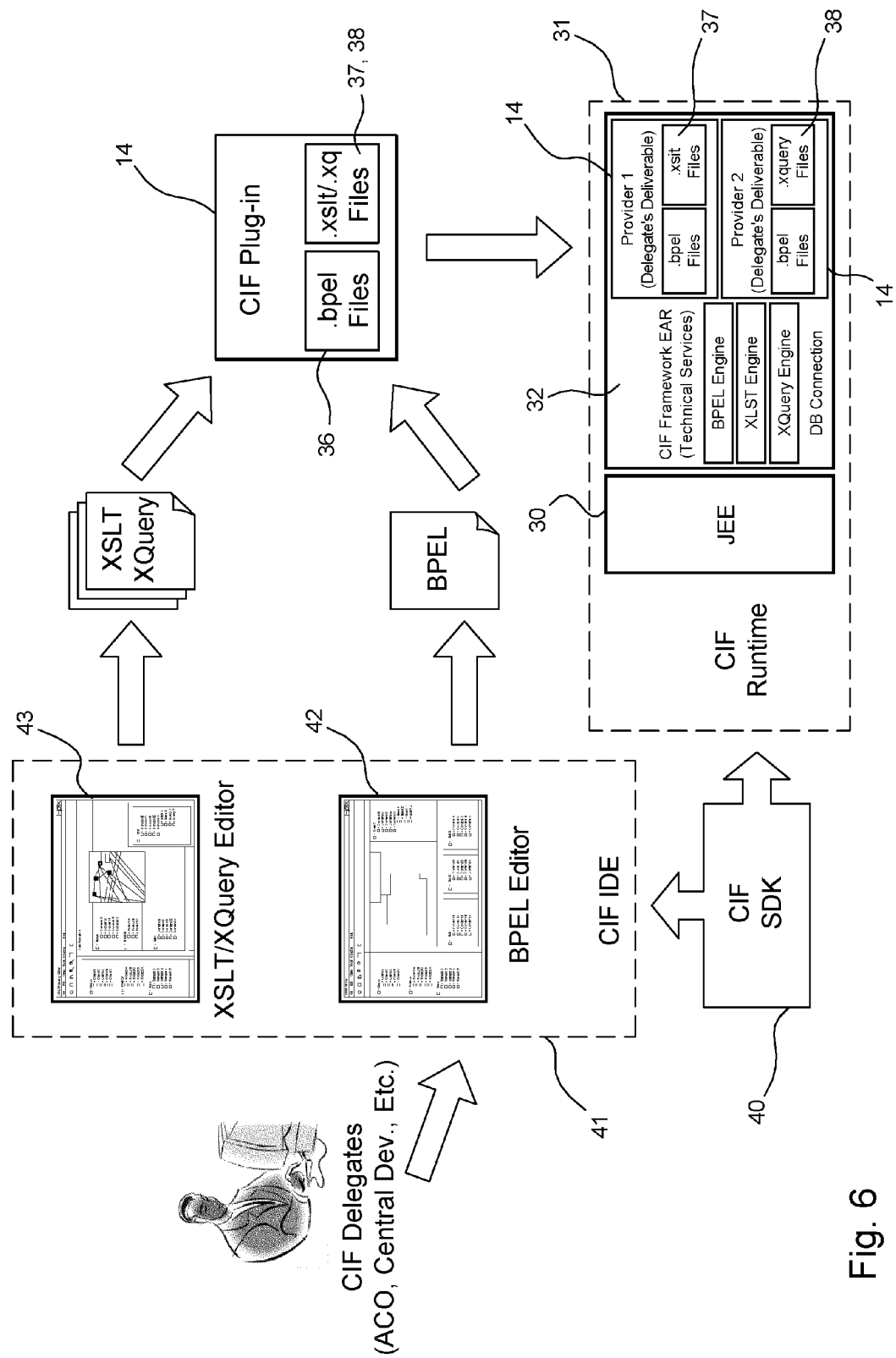

FIG. 6 provides another, more general view on the interconnecting computer's software environment and shows additional components utilized for the development and maintenance of the files 35, 36, 37 and rules, respectively. The CIF runtime 31 basically corresponds to that already presented by FIG. 5. Furthermore, the software environment includes one or more Software Development Kit(s) (SDK) 40 and an Integrated Development Environment (IDE) 41.

Platforms and programming languages used by CIF Runtime 31 and the IDE 41 prescribe which specific SDK(s) 40 is utilized. Examples for SDKs 40 are Java Development Kit, Java WebServices Development Kit, Microsoft Windows SDK and Eclipse.

IDE 41 provides for development and maintenance of the files 35, 36, 37 specifying the mapping rules for mapping the data formats and message flows on the client interface 5 to the content-provider-specific data formats and the content-provider-specific message flows utilized on the provider-specific interfaces 6a, 6b, 6c. The tools offered by IDE 41 depend on which file type has to be processed. In the example of FIG. 6, IDE 41 includes a BPEL editor 42 for generating and processing BPEL files 35 as well as an XSLT/XQuery editor 43. IDE 41 may be accessed remotely or, alternatively, further instances of IDE 41 may be installed on remote machines in order to allow for distributed, out-sourced generation and maintenance of files 35, 36, 37 and mapping rules. Due to the nature of the plug-ins 14 defining the mapping rules by non-executable code in the files 35, 36, 37, rule definition may be done by personnel without any software engineering or programming skills. The personnel only has to be able to use the IDE tools (or, alternatively, even a simple text editor) and knowledge about the syntax of the rules (e.g. XML denotation) to produce BPEL scripts and XSLT/XQuery transformations.

Further, FIG. 6 roughly indicates the process of plug-in creation. Rule defining personnel uses visual tools offered by the IDE 41 to produce the files 35, 36, 37. Additionally or alternatively, non-visual editors like text-based editors may be used. The files 35, 36, 37 are assembled into a plug-in 14, e.g. by scripts packaging the files 35, 36, 37 to a plug-in 14. Not exhaustively, this packaging encompasses operations such as file content and/or format adaptation, creation, move or removal of file(s), as well as compression. The plug-in 14 is deployed into the CIF runtime 31 which is—as described above—an enterprise application that embeds the engines 10, 11, 12 to process the plug-in 14.

Figure 7:
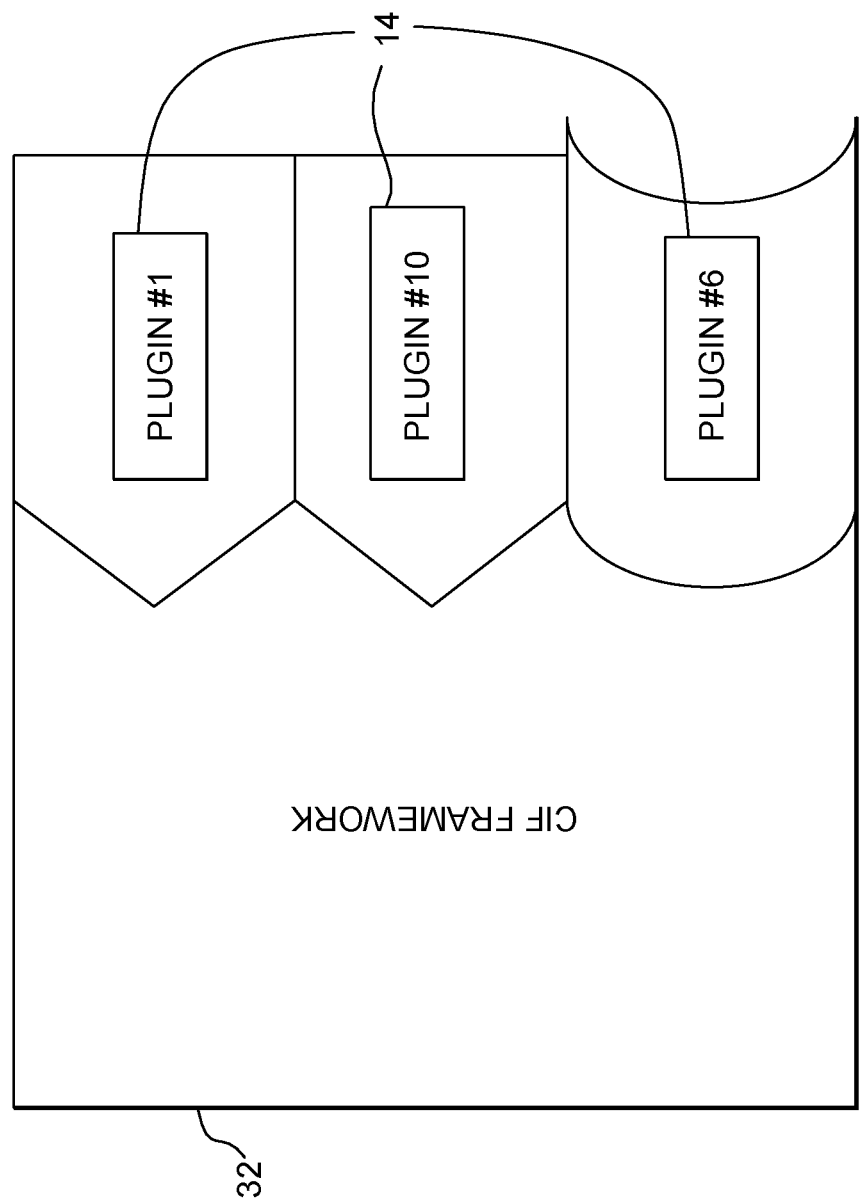
FIG. 7 visualizes the plug-in concept utilized by the interconnecting computer.

FIG. 7 is a schematic visualization of the plug-in approach utilized by the interconnecting computer 4. On the one hand, the interconnecting computer includes a basic framework, e.g. in form of the engines 10, 11 described with reference to FIG. 2. The engine 10, 11 are "fed" by plug-ins 14 as indicated by FIG. 7. A CIF-node cluster is not tied to carry plug-ins 14 for particular content provider platforms 3 or to process content of particular nature or domains. Rather, it can host plug-ins 14 enabling communication with all types of content provider platforms, irrespective of the content offered. This is indicated by FIG. 7 by the different geometric form of the plug-ins 14. While plug-in #1 and plug-in #2 may relate to content provider platforms 3 offering similar content and/or belonging to the same content provider (as indicated by the angular form), plug-in #6 may relate to a completely different content domain and/or a different content provider (as indicated by the rounded form).

FIGS. 8 and 9 visualize an example of data format mapping as performed by the interconnecting computer 4.

FIG. 8 shows two exemplary data formats used for transmitting information on books, the data format being defined by using XML. The left-hand side of FIG. 8 shows the book data format utilized on a content-provider-specific interface 6, while the right-hand side indicates a book data format utilized on the client interface 5.

The content-provider-specific book data format defines a book by the following XML elements: book including attributes ID and publication date; title; authors including one or several author child element(s); and subject.

The client-interface-specific book data format defines a book by the following XML elements: book including attributes ID, title and subject.

The XSLT and XQuery definitions shown by FIG. 9 both provide a mapping of information on books received over the content-provider-specific interface 6 from the content-provider-specific book data format to the client-interface-specific format. Both mapping rules basically do the same: The book content received by the interconnecting computer 4 from the book content provider platform 3 are ordered by their title (XSLT: <xsl:for-each select="title" order="ascending">; XQuery: order by $book/title) and the information for the three attributes being relevant for the client interface 5, namely id, title and subject, are extracted from the content-provider-specific data.

Figure 10A:
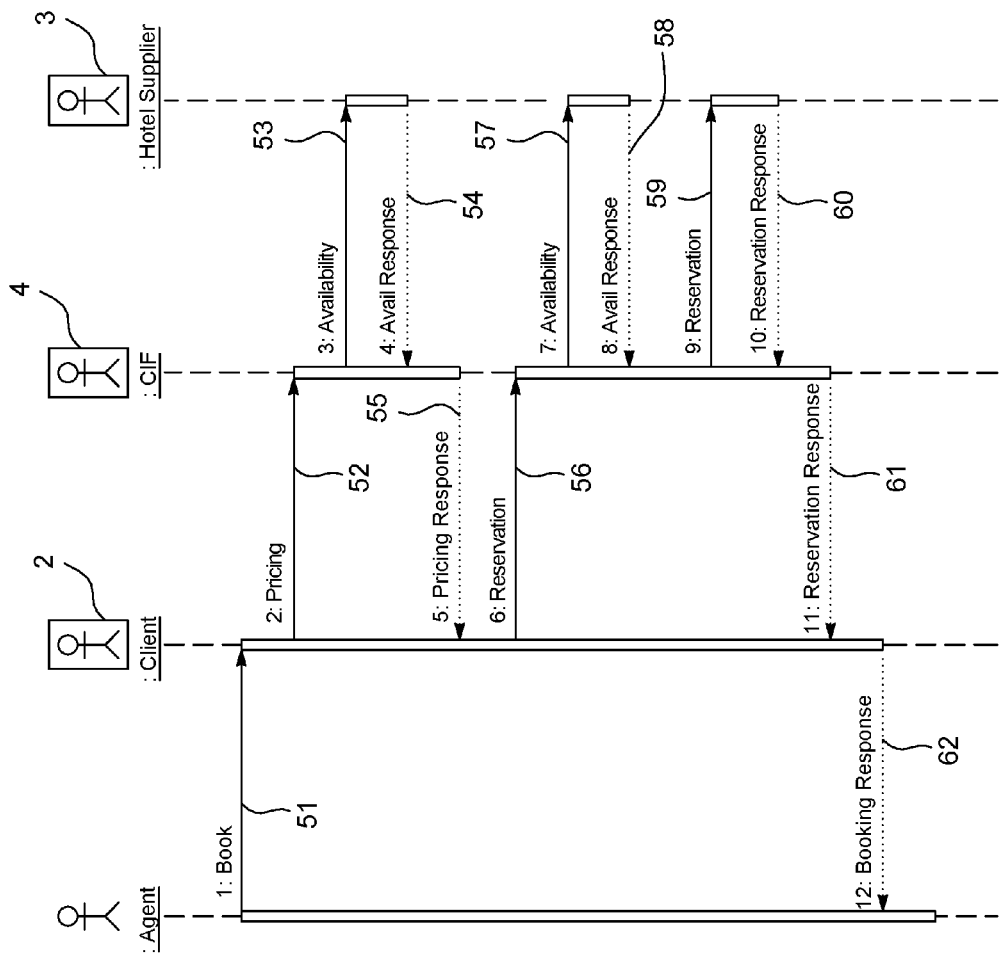
FIGS. 10a, 10b, 11a, 11b, 11c and 12a and 12b are message sequence charts illustrating different examples of message exchange within the system.

FIG. 10a exemplarily visualizes the effect of message flow mapping as performed by the interconnecting computer 4 by showing the process of a booking request e.g. for a hotel room. FIG. 10a shows the message exchange on a high layer of abstraction, namely between four entities agent 50 (which is the user of the client 2), client 2, interconnecting computer 4 and hotel provider platform 3.

The message flow starts with a booking inquiry 51 which the agent enters into the client 2. This inquiry 51 triggers a cascade of subsequent messages which finally supplies the agent 50 with feed-back 62 on a successful hotel room booking.

It is readily apparent from FIG. 10a that the message flow occurring on the client interface 5 substantially differs from the message flow on the provider-specific interface 6. The client 2 implements a two-staged hotel room booking protocol: First, information on pricing is requested with message 52. In response to this, the client 2 expects a pricing response 55. At the second stage, the client 2 requests reservation by transmitting message 56 to the interconnecting computer 4. In turn, the client expects a reservation response message 61.

Between interconnecting computer 4 and hotel provider platform 6, a different message flow is conducted. The interconnecting computer 4 translates the pricing request message 52 into an availability request message 53 and sends it to the hotel provider platform 3. The latter one responds with availability response message 54. Further on, the interconnecting computer translates the reservation request message 56 first in another availability request message 57 which it again directs to the hotel provider platform 3. Again, the hotel provider platform 3 answers this message with an availability response message 58 (the returned availability information included in message 58 may differ from the information given by the first availability response message 54). Only then, the interconnecting computer 4 generates a reservation request message 59 and transmits it to the hotel provider platform 3 which then responds with reservation response message 60.

It can be taken from this example, that the interconnecting computer 4, does not simply relay the two client-originating messages, pricing request message 52 and reservation request message 56, to the hotel provider platform 3. Neither does the interconnecting computer 4 simply relay three hotel-provider-platform-originating response messages, i.e. availability response messages 54 and 58 as well as reservation response message 59 to the client 2. For example, the reservation request message 56 first triggers another round of availability request vis-à-vis the hotel provider platform which is transparent to the client 2. This may be caused e.g. by a requirement of the hotel provider platform 6 according to which reservation requests are always expected to have a direct preceding availability request. Thus, due to the requirements set by the hotel-provider-specific interface, the interconnecting computer 4 translates reservation request message 56 first into availability request message 57 and directs the actual (data-format-mapped) reservation request message 59 to the hotel provider platform 3 only subsequently.

Figure 10B:
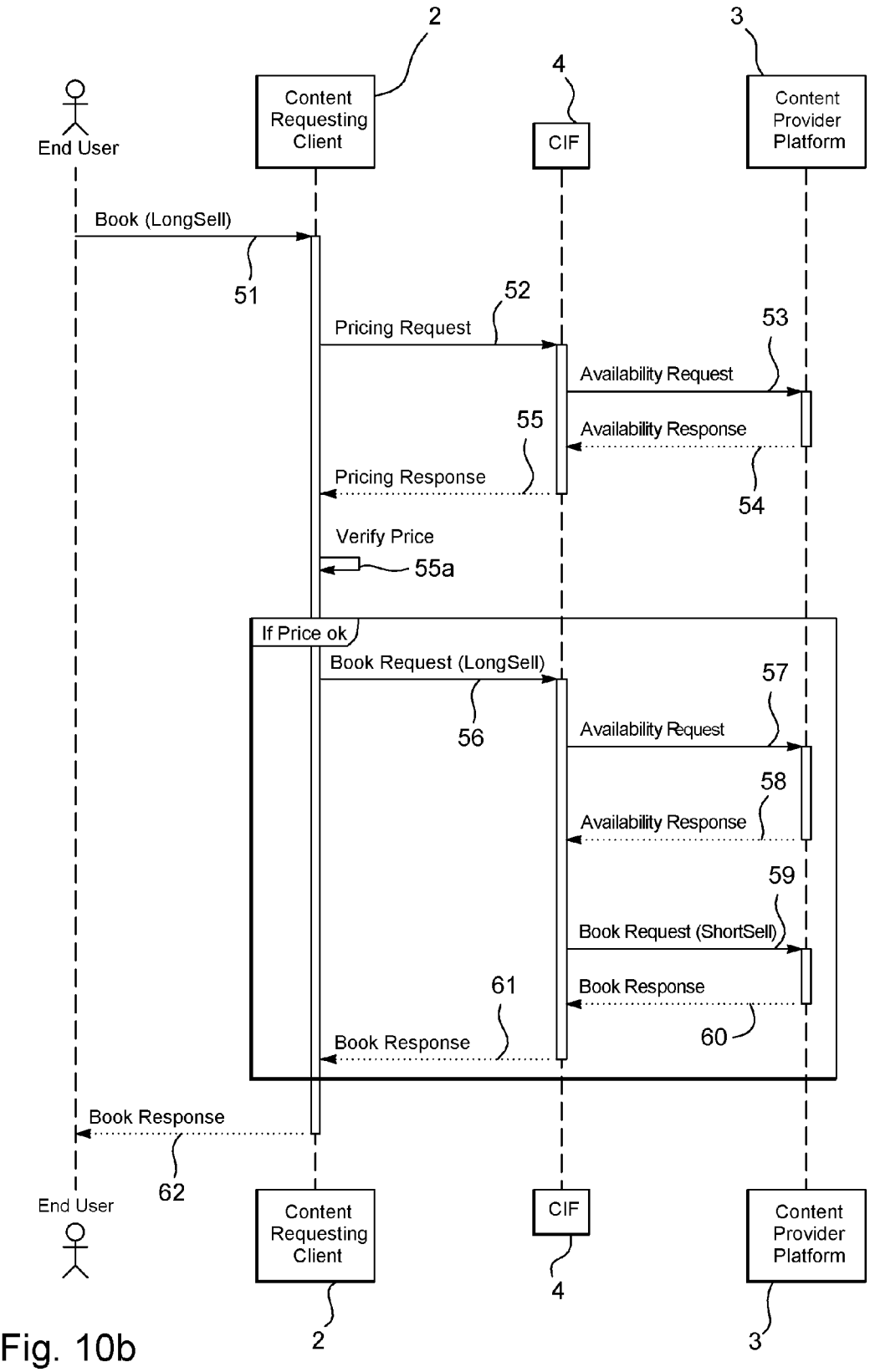

FIG. 10b represents another view on the message flow of FIG. 10a (similar messages of FIG. 10a are designated by similar reference numerals). According to FIG. 10b, the content requesting client 2 is arranged to issue "long sell" booking requests while, on the other hand, the content provider platform 3 is only arranged to process "short sell" booking requests. In this context, "long sell" refers to a request schema wherein the content request already includes all the necessary information to return the finally desired response. It is also referred to as "direct sell". On the other hand, "short sell" implies one or more preliminary requests in order to determine preliminary information and at least one final request which refers back to the preliminary information without actually including it in the final request. Hence, the requested entity is generally required to buffer the preliminary information returned to the requesting entity in order to be able to serve the final "short sell" request.

Now referring back to FIG. 10b, the "long sell" booking request 51 includes all necessary booking details of the product or service to book, including a price indication. The message sequence including messages 52 to 55 has the purpose to verify that the price indicated by booking request 51 is still valid, i.e. the product or service to book is still available for that price at content provider platform 3. Accordingly, by internal activity 55a, the content requesting client 2 verifies the result of this sequence of messages 52 to 55. If the price verification is affirmative, the content requesting client 2 issues a "long sell" booking request to CIF 4 by message 56. This "long sell" booking request 56 is mapped by CIF 4 in terms of data formats and message flow into the protocol required by the content provider platform 3 which offers booking by using "short sell" booking requests preceded by a respective availability request. Thus, the "long sell" booking request 56 triggers the sequence of messages 57 to 61 including availability request 57, availability response 58, "short sell" booking request 59, "short sell" booking response 60 and "long sell" booking response 61. It should be re-emphasized that FIG. 10b is an example only explaining the functionalities of the interconnecting computer 4 in terms of its data format and message flow mapping capabilities. Generally, a need for mapping data formats and message flows may result from difference in the communication mechanisms employed on the client interface 5 and on the content-provider-specific interfaces 6a, 6b, 6c, irrespective of the content and the particular purposes of the messages to be exchanged.

Figure 11A:
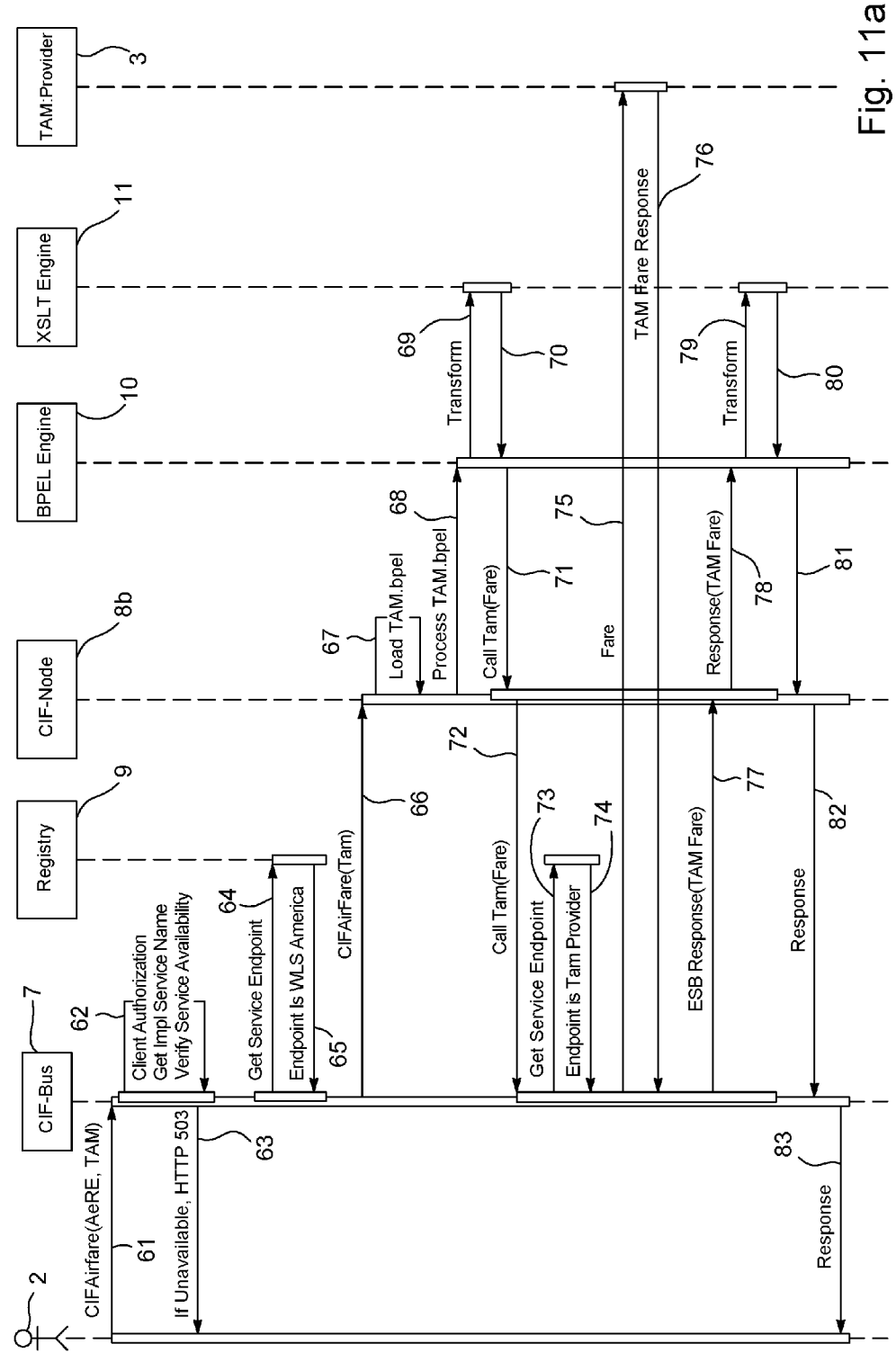

FIG. 11a shows a message flow sequence within the exemplary system presented by FIG. 2 triggered by a client request message 61. Messages are exchanged between the client 2, the interconnecting computer 4 including the components CIF-Bus 7, registry 9, CIF-Node 8b, BPEL engine 10 and XSLT engine 11 and, finally, a content provider platform 3, in the example of FIG. 11a a platform hosted by the air carrier provider TAM, a Brazilian airline.

As mentioned, the message flow starts with a request message 61 from the client 2 arriving at the CIF-Bus 7. In the example of FIG. 11a, message 61 is referred to as "CIFAirFare", i.e. an information request on flight prices. Message 61 has two arguments, "AeRE" indicating the content requesting client being the sender of the content request ("AeRE" here stands for "Amadeus e-Retail Engine", an eCommerce website) and "TAM" indicating the content provider platform 3. After having receipt the request message 61, the CIF-Bus 7, by activity 62, performs a client authorization and determines that the service invoked by request message 61, namely the flight price service, is supported by and actively available in the interconnecting computer 4. If these processes are unsuccessful, e.g. because the client 2 is unauthorized or the requested service is not supported by the interconnecting computer 4, CIF-Bus 7 returns an error message 63 to the client 2. If, on the other hand, check 62 turns out to be successful, the CIF-Bus 7 subsequently contacts the registry 9 (messages 64 and 65) in order to determine the appropriate CIF-Node 8b to further handle the request and perform the data format and message flow mapping. In the example of FIG. 11a, it is determined that the requested content provider platform belong to the group of American providers and a CIF-Node 8b dealing with content provider platforms 3 geographically located in America exists. Further on, the request is relayed to the determined CIF-Node 8b by message 66 indicating the content provider platform 3 in order to put the CIF-Node 8b in the position to select the correct plug-in 14.

By activities 67 and 68, the CIF-Node 8 utilizes the BPEL engine 10 to load and process the rules for message flow mapping, in the example a BPEL file titled "TAM.bpel" defining the message flow mapping rules specific for the content provider platform TAM. As a next phase, the XSLT engine 11 is consulted to map the client-interface-specific data format(s) to the TAM-specific data format(s) (messages 69 and 70). After both mappings have been performed, the BPEL engine 10 and CIF-Node 8, respectively, returns the mapped request by relaying a "Call TAM(Fare)" message back to the CIF-Bus 7 by messages 71 and 72. The designation "Call TAM(Fare)" implies that this message carries information as an argument which fares are requested, as expected by the TAM platform 3.

CIF-Bus 7 then proceeds with directed the "Call TAM (Fare)" to the TAM platform 3. As a preparing activity, location and routing information is retrieved from registry 9 by using message 73 and 74. The actual message exchange with TAM platform 3 is depicted by messages 75 and 76 according to which the Fare request message 75 is transmitted to the TAM platform 3 and the response carrying the requested fares is provided by TAM Fare Response message 76. Note that this is only a schematic indication of the message exchange between CIF-Bus 7 and content provider platform 3. The actual message flow could be more complex and, in particular, result in the exchange of a plurality of message in both directions (as explained above with reference to FIG. 7), such as an initial exchange availability request messages and only afterwards an exchange of fare request messages (as illustrated by FIGS. 10a and 10b).

After the response from the TAM platform 3 has been received by the interconnecting computer 4, it is re-mapped by messages 77 through 82 in a similar, but reversed fashion as the mapping has been conducted before (by messages 66 through 72). CIF-Bus 7 forwards the provider response message to CIF-Node 8 by message 77 carrying the requested fare information. CIF-Node 8 induces the re-mapping back to client-interface-specific message by sending message 78 to BPEL engine 10. Re-mapping back to client-interface-specific data format(s) is again performed by the XSLT engine 11 which receives the information by message 79 and returns the remapped information back to BPEL engine 10 by message 80. BPEL engine 10 then returns the response having been re-mapped in terms of message-flow and data-format to the superordinate CIF-Node 8 by message 81 which further relays it to CIF-Bus 7 by message 82. CIF-Bus 7 finally returns the requested information to the client 2 by message 83.

Figure 11B:
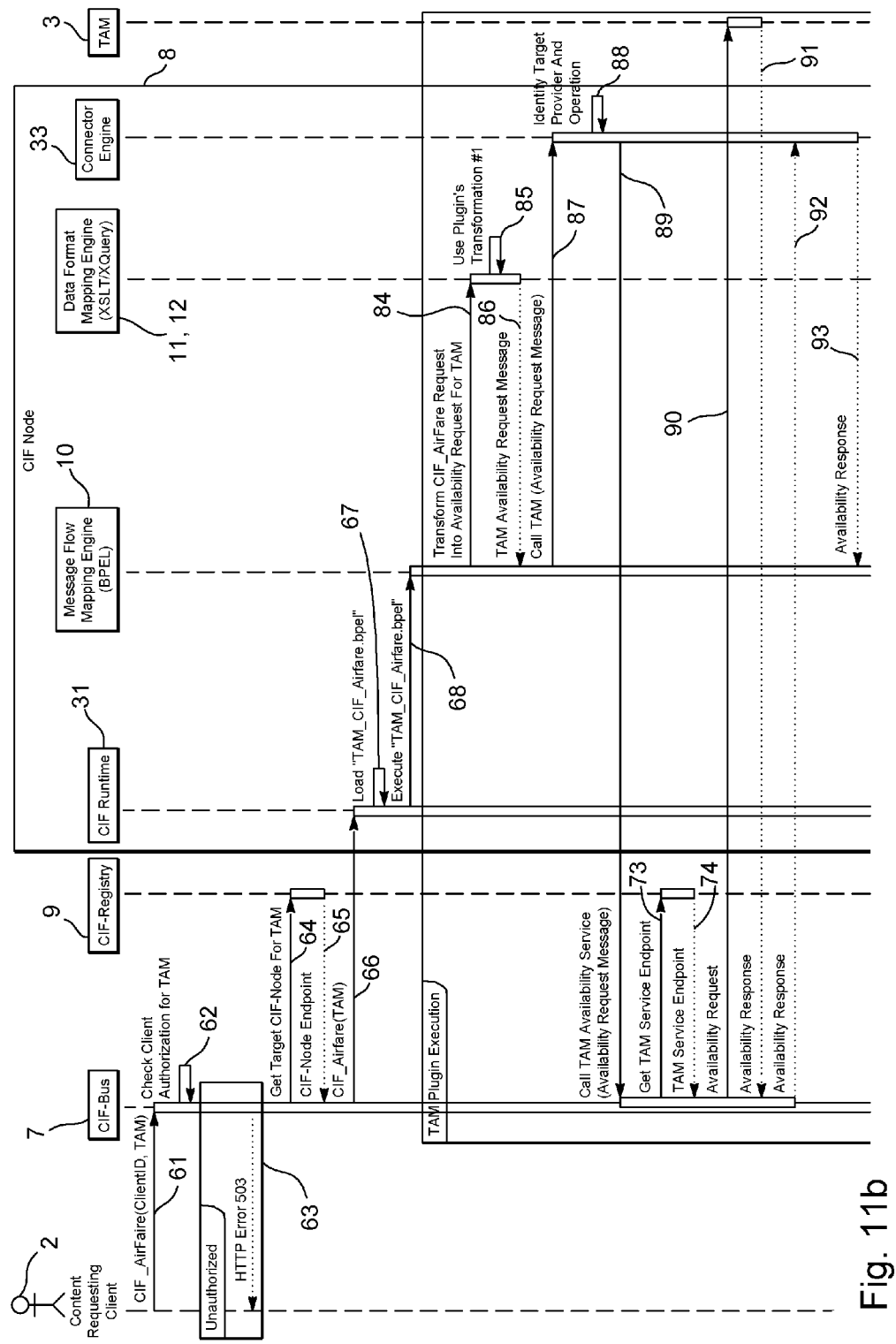
Figure 11C:
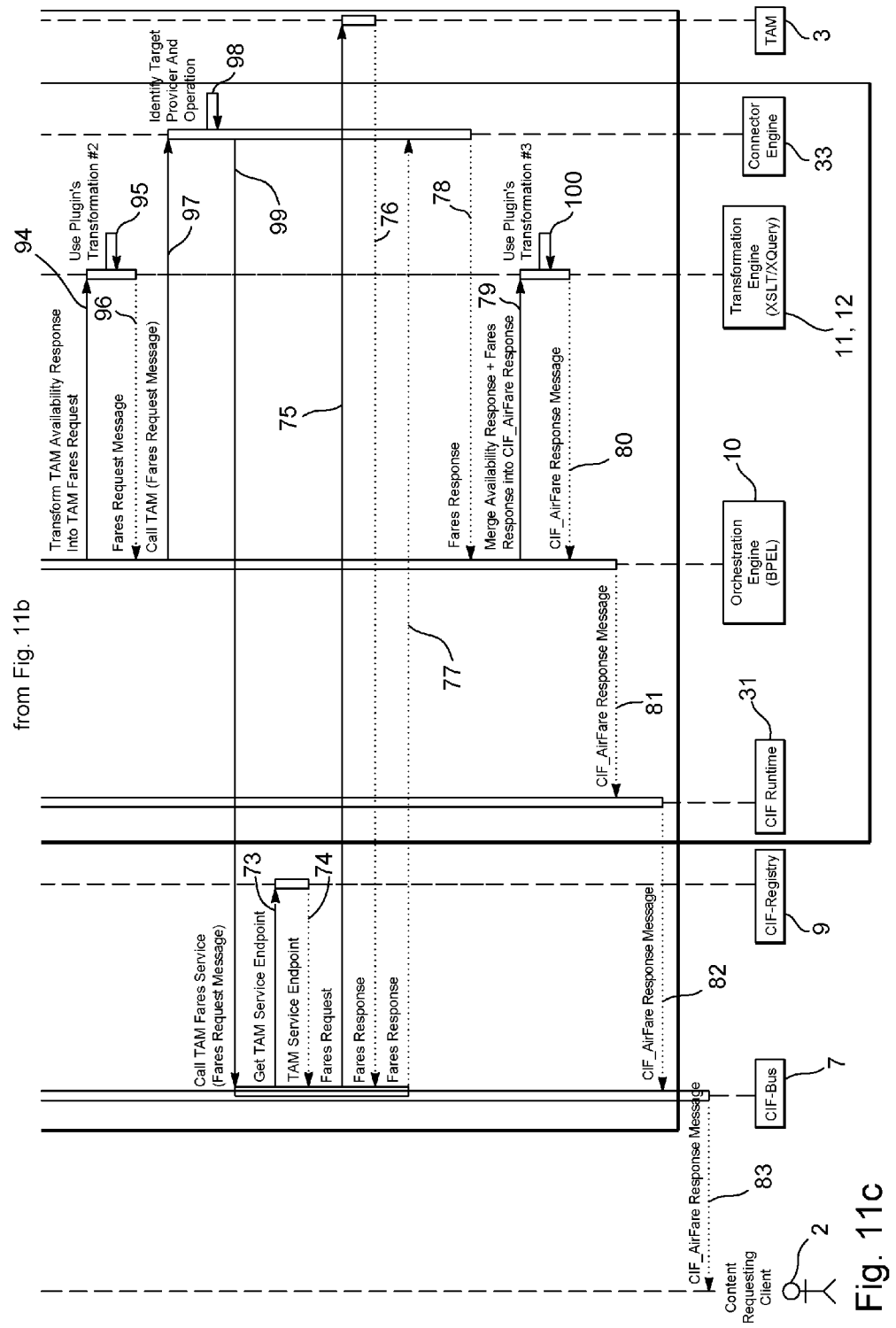

FIGS. 11b and 11c provide some further insights into the utilization of the plug-ins 14. They refer back to the example of FIG. 11a and contain some further details on the CIF-internal message flow. As with FIGS. 10a and 10b, similar messages are referred to in FIGS. 10a and 10b by similar reference numerals.

From an architectural point of view, FIGS. 11b and 11b depict the CIF-Node 8 with a greater granularity than FIG. 11a. The CIF-Node's software architecture referred to by FIGS. 11b and 11c is in line with FIG. 5, meaning that the CIF-Node 8 includes the CIF Runtime 31, the BPEL engine 10, the XSLT engine 11, the XQuery engine 12 (both depicted as an integrated engine 11, 12) and the connector engine 33.

Messages 61 to 68 of FIG. 11b correspond to messages 61 to 68 of FIG. 11a. Similarly, messages 73 to 83 of FIGS. 11b and 11c correspond to messages 73 to 83 of FIG. 11a. Regarding messages 69 to 72 of FIG. 11a, FIG. 11b, however, shows a more detailed or additional message flow as follows: After the BPEL engine 10 has received the request 68 representing the client's original AirFare request 61, it performs a message-flow transformation resulting in a two-staged communication with the content provider platform 3. At the first stage, the CIF 4 converts the AirFare request 61 into an availability request (covering messages 84 to 93). At the second stage, it retrieves the requested fares from content provider platform 3 (represented by messages 94 to 99 as well as 75 to 78). Thus, the example of FIGS. 11b and 11c is similar to the second part of FIGS. 10a and 10b according to which a booking request by the client 2 is converted by the CIF 4 into a two-staged message flow with the content provider platform 3 including an availability request/response 57, 58 and a booking request/response 59, 60.

In the first stage, the BPEL engine 10 determines that an availability request has to be issued to the content provider platform in order to find out the flight schedules and available seats prior to calculating any prices. Thus, BPEL engine 10 orders the XSLT engine 11 or the XQuery engine 12 by message 84 to transform the AirFare request 61 into an availability request processible by the content provider platform 3. This data format transformation is performed by activity 85 on the basis of the respective plug-in 14. The XSLT engine 11 or the XQuery engine 12 returns the resulting availability request message 86 to the BPEL engine 10 which, in turn, forwards it to the connector engine 33. The connector engine 33 determines the correct content provider by activity 88 and forwards the message 89 to the CIF-Bus 7. In the example of FIG. 11b, the forwarding is performed by a WebService operation. It may, for example, include recognition of content-provider-platform-identifying information in the message 87 received from the BPEL engine 10, additional message encapsulation activity and/or security functions (such as adding security header information).

The CIF-Bus 7, performs the determination of the content provider platform 3 by activities 73 and 74, in order to route the availability request to the content provider platform as already outlined above with reference to FIG. 11a. Next, the CIF-Bus 7 transmits the availability request with message 90 to the content provider platform 3. Content provider platform 3 returns its response to the CIF-Bus 7 by message 91. CIF-Bus 7 forwards this availability response with message 92 to the connector engine 33 which, in turn, relays it to the BPEL engine 10 by message 93. Relaying performed by the connector engine 33 may include reverse activities as described, i.e. recognition of client-identifying information in the message 92 received from the content provider platform 3, message unpacking activity and/or security functions (such as evaluating security header information).

At that point, BPEL evaluates the availability response by the content provider platform 3. The CIF 4 now has knowledge of the flight schedules and available seats. BPEL engine 10 utilizes these information to generate a second request concerning the fares as requested by the client's original AirFare request 61. BPEL engine 10, by message 94, then orders the XSLT engine 11 or the XQuery engine 12 to perform a data format transformation of the availability response into a fares request. This is executed by activity 95, again by utilizing the respective plug-in 14 for the content provider platform 3.

The resulting fares request is relayed through the CIF 4 by messages 96, 97, provider identification activity 98 and message 99 similar to the first communication stage. The CIF-Bus 7 then performs the actual fares request with the content provider platform 3 by messages 75 and 76. The fares response 76 received from content provider platform 3 is relayed back to the BPEL engine 10 by messages 77 and 78. After having evaluated the fares response information, BPEL engine 10, by message 79, orders the XSLT engine 11 or XQuery engine 12 to merge the information retrieved by the availability request/response at the first communication stage and the fares request/response at the second communication stage into an AirFare response in accordance with the communication protocol employed at the client interface 5. Engine 11 or 12 fulfils this order by performing the necessary data format mapping in activity 100, again by utilizing the respective plug-in 14. The resulting AirFare response is returned to the client 2 by messages 80 through 83, as already described with reference to FIG. 11a.

Figure 12A:
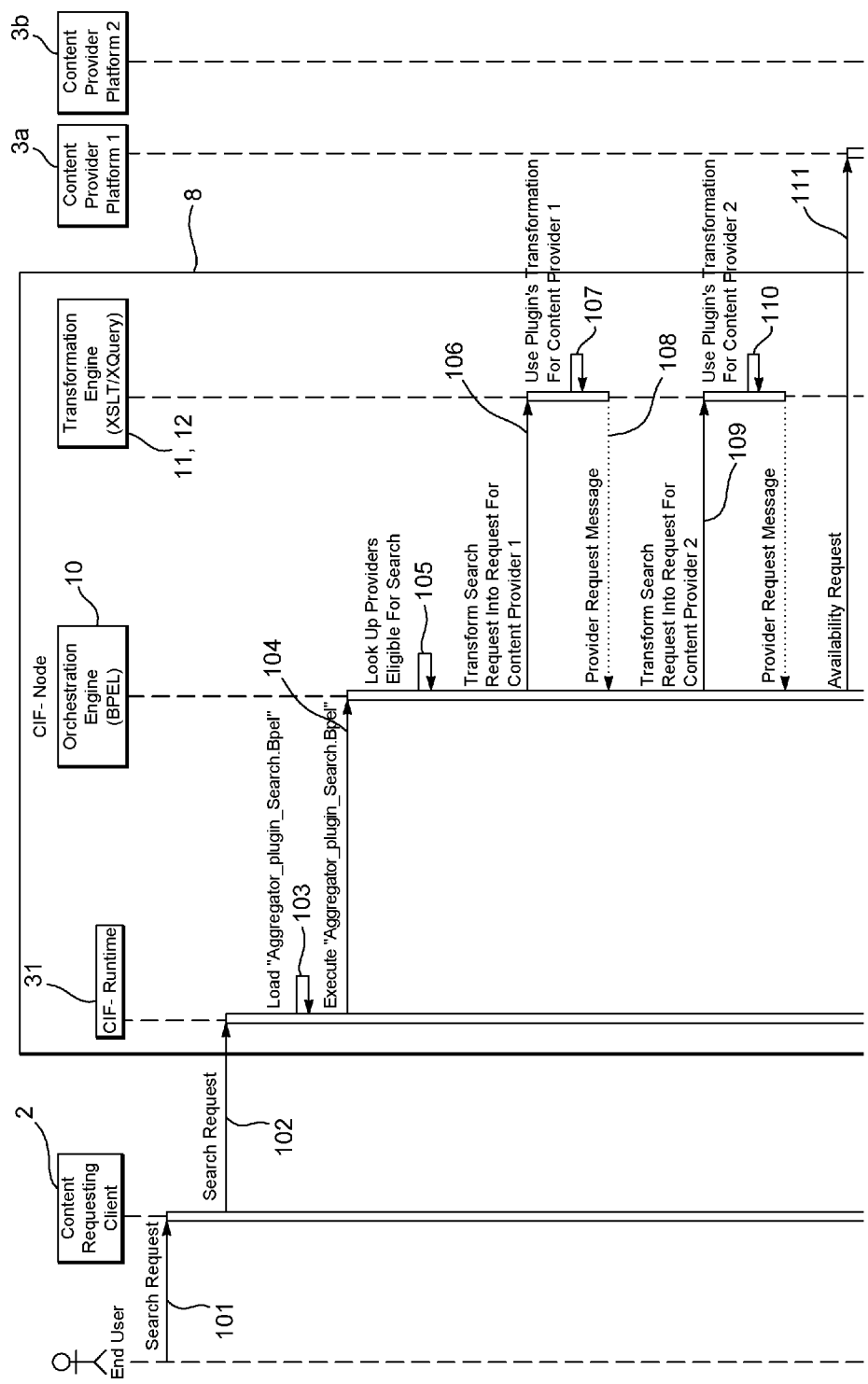
Figure 12B:
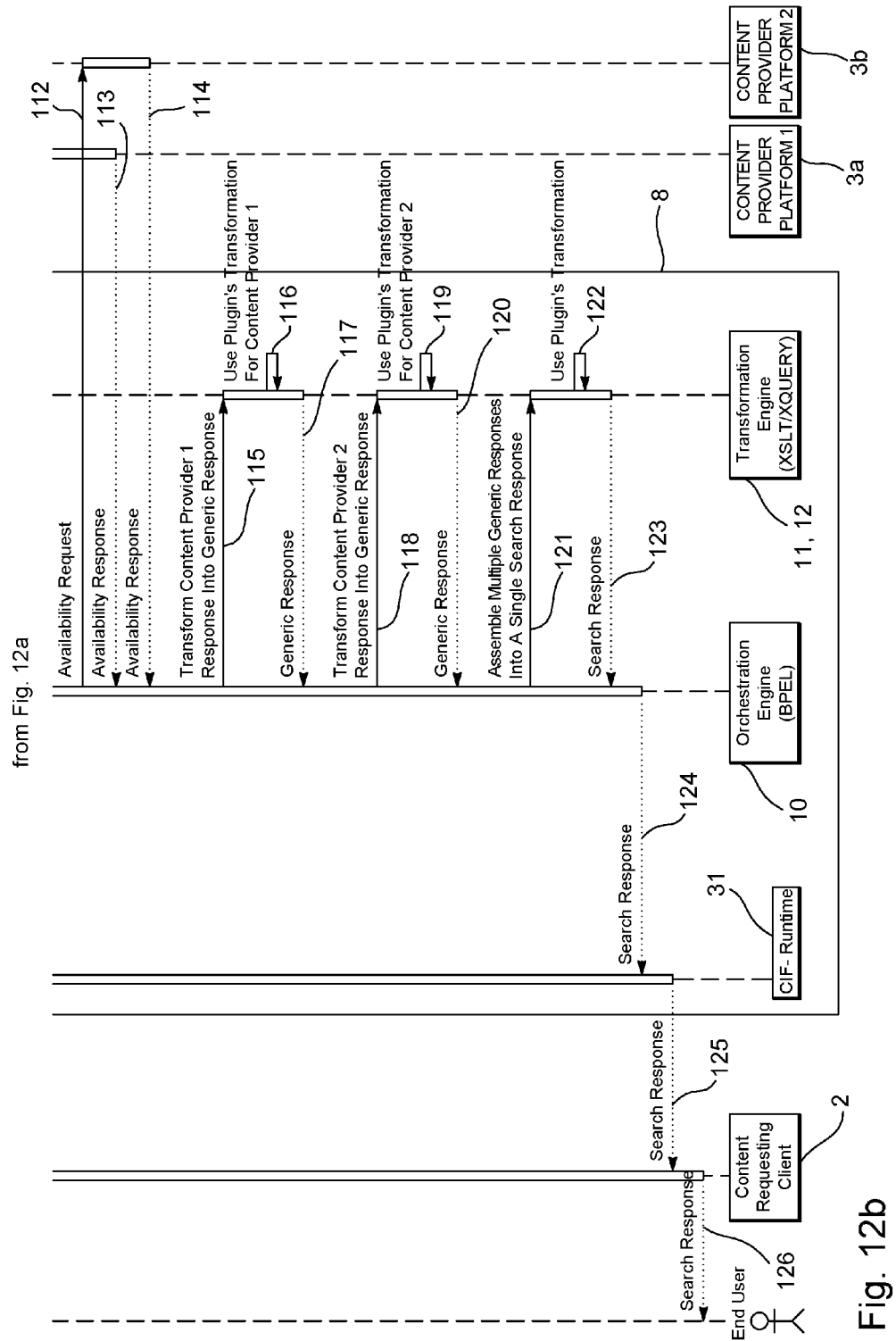

FIG. 12 (being formed by FIGS. 12a and 12b) depicts a message flow illustrating a further example of a message flow and data format mapping performed by using the plug-ins 14. In the example of FIG. 12, the CIF-Node 8 converts a request received by a content requesting client 2 over the client interface 5 into a plurality of content-provider-specific requests and issues these multiple content-provider-specific requests to a plurality of content provider platforms 3. It further re-assembles the respective responses obtained from the plurality of content provider platforms into a unified response to be returned to client 2 via the client interface 5. For reasons of brevity, the CIF elements CIF-Bus 7 and connector engine 33 are omitted in FIG. 12.

The message sequence of FIG. 12 starts with an end user entering a search request 101 into content requesting client 2. Content requesting client 2 then transmits the search request 102 to the CIF-Node 8. The search request 102 arrives at the CIF runtime 31 which, by activity 103, loads the plug-in 14 responsible for processing the search request 102. In the example of FIG. 12, the search request 102 is processed by an aggregated plug-in 14 (referred to as "Aggregator_plugin_Search") which is arranged to map the search request 102 for communication with multiple content provider platforms employing different message flows and data formats.

By message 104, the CIF runtime 31 orders the BPEL engine 10 to perform the message flow mapping by utilizing the aggregated plug-in's bpel-file ("Aggregator_plugin_Search.bpel"). In the example of FIG. 12, this message flow mapping includes generation of provider-specific messages to be sent to two content provider platforms 3a, 3b which are determined to be eligible for answering the search requests by activity 105. This determination 105 of the two content provider platforms 3a, 3b may be implemented by BPEL engine in various way, e.g. by hardcoded software, by querying an internal database and/or by employing a rule engine component prescribing which content provider platforms 3 are to be contacted for which types of search requests. As a consequence of the message flow mapping, the BPEL engine 10 then orders the XSLT engine 11 and/or the XQuery engine 12, by messages 106 and 109, to transform the search request 102 into two content-provider-specific requests (e.g. availability requests), one to be directed to content provider platform 3a and the other one to be directed to content provider platform 3b. The XSLT engine 11 and/or the XQuery engine 12 perform(s) the respective data format mappings by activities 107 and 110 and return the resulting content-provider-specific requests to BPEL engine 10 by messages 108 and 111.

The BPEL engine 10 then has the two content-provider-specific requests to be transmitted to the content provider platform 3*a* and to the content provider platform 3*b* by messages 112 and 113, respectively. Both content provider platforms 3*a*, 3*b* respond with messages 114 and 115.

Next, the BPEL engine 10 processes the responses 114 and 115 by ordering the XSLT engine 11 and/or the XQuery engine 12 to re-map the responses 114 and 115 to the data format(s) applied on the client interface 5. To this end, BPEL engine 10 sends orders 116 and 119 to the XSLT engine 11 and/or the XQuery engine 12 which, in turn, perform the re-mapping on the basis of the aggregated plug-in 14 by activities 117 and 120, respectively. The re-mapped responses are returned to the BPEL engine by messages 118 and 121.

In response to having received the messages 118 and 121, the BPEL engine 10 orders the XSLT engine 11 and/or the XQuery engine 12, by message 122, to assemble a the two re-mapped responses into a single search response. XSLT engine 11 and/or the XQuery engine 12 perform(s) this by activitiy 123, again by utilizing aggregated plugin 14. It returns the re-assembled search response to BPEL engine 10 by message 124. The message sequence is then concluded by the BPEL engine 10 forwarding the re-assembled search response to CIF runtime 31 by message 125 which returns the re-assembled search response over the client interface 5 to content requesting client 2. The search response may be displayed to the end user by activity 127.

Note that the message sub-sequences relating to content provider platform 3*a* (messages/activities 106 to 108, 112, 114 and 116 to 118) and to content provider platform 3*b* (messages/activities 109 to 111, 113, 115 and 119 to 121) may occur in any order, e.g. in the sequential interleaved order as depicted by FIG. 12, in a truly sequentially order (i.e. first messages/activities 106 to 108, 112, 114 and 116 to 118, then messages/activities 109 to 111, 113, 115 and 119 to 121) or substantially in parallel. In particular, the content-provider-specific requests 112 and 113 may be transmitted to the content provider platforms 3*a*, 3*b* at the same time. Also the responses 114, 115 from the content provider platforms 3*a*, 3*b* may be transmitted in a different order than indicated by FIG. 12 (e.g. response 115 prior to response 114). The re-assembly of the two responses from the content provider platforms 3*a*, 3*b* (messages 122 to 124) will only be performed after the two responses 114 and 115 have been received by the CIF 4 and have been re-mapped in terms of data formats (messages/activities 116 to 121).

Figure 13:
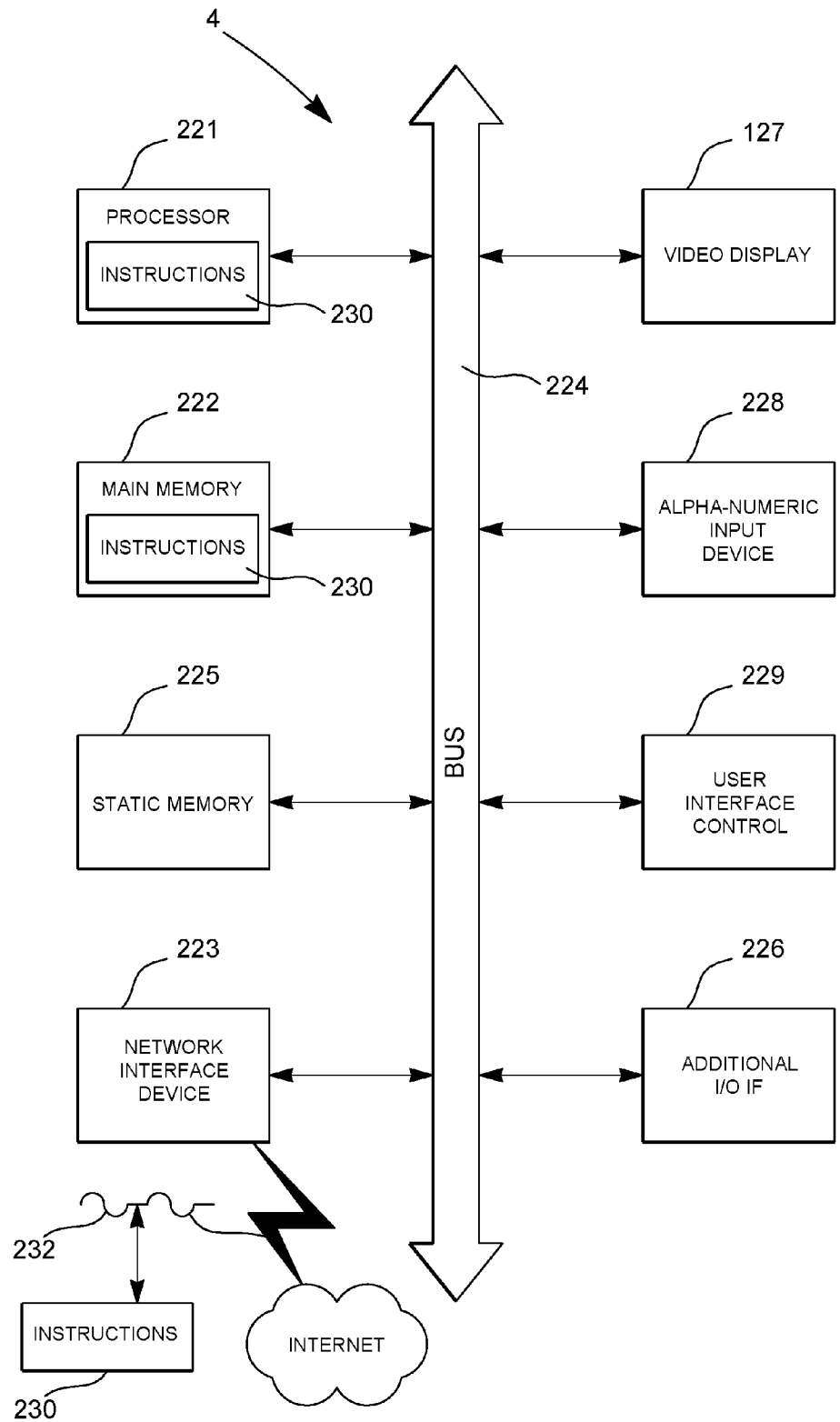
FIG. 13 is an exemplary schematic view of the internal architecture of interconnecting computer.

Finally, FIG. 13 is a diagrammatic representation of an exemplary internal structure of interconnecting computer 4 wherein the interconnecting computer 4 is exemplarily arranged as a single machine such as a personal computer or a server. The interconnecting computer 4 is arranged to execute a set of instructions, to cause it to perform any of the methodologies discussed herein. The interconnecting computer 4 includes at least one processor 221, a main memory 222 and a wired and/or wireless network interface 223 (such as a Wi-Fi and/or Bluetooth interface) and/or a 2G/3G/4G mobile network interface device, all of which communicate with each other via a bus 224. It further includes a static memory 225, e.g. non-removable flash and/or solid state drive and/or a removable Micro or Mini SD card, which permanently stores the software enabling the interconnecting computer 4 to execute its functions including timer initialization, generation of cache-based responses, cache and accuracy update, etc. and to communicate with the content requesting clients 2 and the content provider platforms 3 and, optionally, to other local hosts within a local or wide area network. Furthermore, it includes a display 227, a user interface control module 229 and an alpha-numeric and cursor input device 228. The wired and/or wireless network interface device 223 allows network connection at least with the content request clients 2 and the content provider platforms 3. Optionally, additional I/O interfaces 226 such as card reader and USB interfaces may be present. An executable set of instructions (i.e. software) 230 embodying any one, or all, of the methodologies described above, resides completely, or at least partially, permanently in the non-volatile memory 225. When being executed, respective process data resides in the main memory 222 and/or the processor 121. The software 230 may further be transmitted or received as a propagated signal 232 through the wired or wireless network interface device 223 from/to a software server within the local area network or the wide area network such as the Internet.

The other computer hosts mentioned herein such as the content requesting clients 2 and the content provider platforms 3 are generally constructed in a similar way.

The methodologies described herein, in particular those embodied with the interconnecting computer 4 can be applied for various purposes. As an example only, they can be implemented in a travel booking and reservation system in which customers such as private or business users (e.g. travel agents) place enquiries for travel recommendations and reservations. Hence, the content requesting clients 2 are formed by the computers of these customers and users. The overall system includes an interconnecting computer 4 which may be operated by a service provider offering a unified travel booking frontend to the customers. The interconnecting computer 4 operates according to the principles explained in detail above. The content provider platforms 3 correspond to information technology system (such as servers, databases, etc.) of travel products providers such as airlines (Air France, Lufthansa, US Airways etc.), rental car companies (e.g. Hertz, Avis, Europcar, Alamo, Enterprise, Sixt etc.), hotels, train companies (such as SNCF, Deutsche Bahn), providers of all-inclusive tours, insuring companies, retailers (such as WalMart, Carrefour, Tesco), etc. The offers of these travel product providers are made available to the customers by the infrastructure of the service provider, i.e. the interconnecting computer 4. The customers transmit their booking or reservation requests to the service provider who processes them by utilizing the interconnecting computer 4. In response to requests received from the customers, the interconnecting computer 4 selects one or a plurality of appropriate travel product provider platforms 3, maps the requests to their provider-specific message flows and data formats and performs the message flow with the respective content provider platform(s) according to their proprietary communication protocols. Responses from the travel provider platforms 3 are mapped back to the data formats and message flow employed on the communication interface vis-à-vis the customers over which they received the responses to their original requests.

The program code embodied in any of the applications/modules described herein is capable of being individually or collectively distributed as a program product in a variety of different forms. In particular, the program code may be distributed using a computer readable media, which may include computer readable storage media and communication media. Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. Communication media may embody computer readable instructions, data structures or other program modules. By way of example, and not limitation, communication media may include wired media such as a wired network or direct-wired connection, and wireless media such as acoustic, RF, infrared and other wireless media. Combinations of any of the above may also be included within the scope of computer readable media.

These computer program instructions may also be stored in a computer readable medium that can direct a computer, other types of programmable data processing apparatus, or other devices to function in a particular manner, such that the instructions stored in the computer readable medium produce an article of manufacture including instructions that implement the function/act specified in the block or blocks of the flowchart and/or block diagram.

The computer program instructions may also be loaded onto a computer, other programmable data processing apparatus, or another device to cause a series of computations to be performed on the computer, the other processing apparatus, or the other device to produce a computer implemented process such that the executed instructions provide one or more processes for implementing the functions/acts specified in the flowchart and/or block diagram block or blocks.

The terminology used herein is for the purpose of describing particular embodiments only and is not intended to be limiting of the embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "includes", "having", "has", "with", "comprised of", or variants thereof are used in either the detailed description or the claims, such terms are intended to be inclusive in a manner similar to the term "comprising."

While all of the present invention has been illustrated by a description of various embodiments and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the Applicant's general inventive concept.

What is claimed is:

1. A computer system for interconnecting content-requesting clients with a plurality of content provider platforms offering content, the computer system comprising:
a client interface executed by a processor configured to exchange a plurality of transaction-oriented messages with the content-requesting clients;
an interconnecting computer for providing an interface between the client interface and the plurality of content provider platforms, the interconnecting computer including a runtime module, the runtime module executed by a processor configured to map content-provider-specific data formats and content-provider-specific message flows to data formats and message flows utilized by the client interface, wherein at least one message flow utilized by the client interface comprises a first-stage content request from one of the content-requesting clients; and
a plurality of content-provider-related plug-ins executed by a processor and hosted by the runtime module of the interconnecting computer, each content-provider-related plug-in defining a plurality of rules for a mapping between the content-provider-specific data formats and the content-provider-specific message flows of at least one of the content provider platforms and the data formats and the message flows utilized by the client interface, wherein the content-provider-related plug-ins connect the interconnecting computer to the content provider platforms, and
wherein at least one of the content-provider-specific message flows comprise a first request sent to the at least one of the content provider platforms, and the runtime module is arranged to map the at least one message flow utilized by the client interface and the at least one of the content-provider-specific message flows by:
converting the first-stage request from the content-requesting client into the first request;
sending the first request to the at least one of the content provider platforms;
determining that the at least one of the content provider platforms has sent a first response;
in response to determining that the at least one of the content provider platforms has sent the first response, sending a first content response to the content-requesting client;
determining that the content-requesting client has sent a second-stage content request; and
in response to determining that the content-requesting client has sent the second-stage content request, converting the second-stage content request again into the first request.

2. The computer system of claim 1 wherein the runtime module is further configured to determine the at least one of the content provider platforms to answer a content request received via the client interface.

3. The computer system of claim 1 wherein the rules are defined by non-executable files.

4. The computer system of claim 3 wherein each plug-in includes at least one Business Process Execution Language (BPEL) file defining the rules for the mapping between the content-provider-specific message flows of the at least one of the content providers and the message flows utilized by the client interface.

5. The computer system of claim 3 wherein each plug-in includes either at least one Extensible Stylesheet Language Transformations (XSLT) file or at least one XQuery file defining the rules for the mapping between the content-provider-specific data formats of the at least one of the content provider platforms and the data formats utilized by the client interface.

6. The computer system of claim 1 further comprising:
an integrated development environment including development tools configured to define the rules.

7. The computer system of claim 1 wherein the computer system is configured as a stateless communication platform able to communicate with at least one of stateful content requesting clients and stateful content provider platforms by adding state data to messages respectively exchanged with the stateful content requesting clients and the stateful content provider platforms.

8. The computer system of claim 1 further comprising:
a system bus configured to adapt communication protocols to and from the content provider platforms.

9. The computer system of claim 1 wherein the unique content providers each represent either a different geographical region or a categorization of content provider based on performance.

10. The computer system of claim 1 wherein the runtime module is further arranged to map the at least one message flow utilized by the client interface and the at least one of the content-provider-specific message flows by:
after converting the second-stage request again into the first request, sending the first request to the at least one content provider platform;
in response to again receiving the first response from the at least one content provider platform, evaluating information of the first response;
generating a second request that is based on the information of the first response; and
sending the second request to the at least one content provider platform.

11. The computer system of claim 10 wherein the runtime module is further arranged to map the at least one message flow utilized by the client interface and the at least one of the content-provider-specific message flows by:
in response to receiving a second response from the at least one content provider platform, evaluating information of the second response;
merging the information of the first response and the information of the second response together into a second content response; and
sending the second content response to the content-requesting client.

12. A method of message exchange between content requesting clients and a plurality of content provider platforms offering content, the method comprising:
receiving, at an interconnecting computer, a content request from a content requesting client via a client interface, wherein the interconnecting computer is for providing an interface between the client interface and the plurality of content provider platforms and hosts a plurality of content-provider-related plug ins;
mapping, with the interconnecting computer, the content request to at least one content-provider-specific message flow comprising at least one provider message formatted in accordance with content-provider-specific data formats, the mapping utilizing at least one of the plurality of content-provider-related plug-ins, each content-provider-related plug-in defining a plurality of rules to map between the content-provider-specific data formats and content-provider-specific message flows of at least one of the content provider platforms and data formats and message flows utilized by the client interface, and the content-provider-related plug-ins connect the interconnecting computer to the content provider platform, wherein at least one message flow utilized by the client interface comprises a first-stage content request from one of the content-requesting clients, and wherein at least one of the content-provider-specific message flows comprise a first request sent to the at least one of the content provider platforms; and
implementing the mapping of the at least one message flow utilized by the client interface and the at least one of the content-provider-specific message flows by:
converting the first-stage request from the content-requesting client into the first request;
sending the first request to the at least one of the content provider platforms;
determining that the at least one of the content provider platforms has sent a first response;
in response to determining that the at least one of the content provider platforms has sent the first response, sending a first content response to the content-requesting client;
determining that the content-requesting client has sent a second-stage content request; and
in response to determining that the content-requesting client has sent the second-stage content request, converting the second-stage content request again into the first request.

13. The method of claim 12 further comprising:
determining, with the interconnecting computer, the at least one of the content provider platforms to answer the content request received via the client interface.

14. The method of claim 12 wherein the rules are defined by non-executable files.

15. The method of claim 14 wherein each plug-in includes at least one of:
at least one Business Process Execution Language (BPEL) file defining the rules for the mapping between the content-provider-specific message flows of the at least one of the content providers and the message flows utilized by the client interface, and
either at least one XSLT Extensible Stylesheet Language Transformations (XSLT) file or at least one XQuery file defining the rules for the mapping between the content-provider-specific data formats of the at least one of the content provider platforms and the data formats utilized by the client interface.

16. The method of claim 12 wherein the interconnecting computer comprises an integrated development environment including development tools, and further comprising:
defining the rules using the development tools.

17. The method of claim 12 wherein the interconnecting computer is a stateless communication platform able to communicate with at least one of stateful content requesting clients and stateful content provider platforms by adding state data to messages respectively exchanged with the stateful content requesting clients and the stateful content provider platforms.

18. The method of claim 12 wherein the unique content providers each represent either a different geographical region or a categorization of content provider based on performance.

19. A program product comprising:
a non-transitory computer readable storage medium; and
program code stored on the non-transitory computer readable storage medium and configured, upon execution on an interconnecting computer for message exchange between content requesting clients and a plurality of content provider platforms offering content by using content-provider-specific communication protocols, to cause the interconnecting computer to:

receive a content request from a requesting client via a client interface, wherein the interconnecting computer provides an interface between the client interface and the plurality of content provider platforms;

map the content request to at least one content-provider-specific message flow comprising at least one provider message formatted in accordance with content-provider-specific data formats, the content request being mapped utilizing at least one of a plurality of content-provider-related plug-ins that are hosted by the interconnecting computer, each content-provider-related plug-in defining a plurality of rules to map between the content-provider-specific data formats and content-provider-specific message flows of at least one of the content provider platforms and data formats and message flows utilized by the client interface, and the content-provider-related plug-ins connect the interconnecting computer to the content provider platform, wherein at least one message flow utilized by the client interface comprises a first-stage content request from one of the content-requesting clients, and wherein at least one of the content-provider-specific message flows comprise a first request sent to the at least one of the content provider platforms; and implementing the mapping of the at least one message flow utilized by the client interface and the at least one of the content-provider-specific message flows by:

converting the first-stage request from the content-requesting client into the first request;

sending the first request to the at least one of the content provider platforms;

determining that the at least one of the content provider platforms has sent a first response;

in response to determining that the at least one of the content provider platforms has sent the first response, sending a first content response to the content-requesting client;

determining that the content-requesting client has sent a second-stage content request; and in response to determining that the content-requesting client has sent the second-stage content request, converting the second-stage content request again into the first request.

* * * * *